United States Patent
Kang et al.

(10) Patent No.: US 11,121,754 B2
(45) Date of Patent: Sep. 14, 2021

(54) METHOD FOR MEASURING AND REPORTING CHANNEL STATE INFORMATION IN WIRELESS COMMUNICATION SYSTEM AND DEVICE FOR SAME

(71) Applicant: LG ELECTRONICS INC., Seoul (KR)

(72) Inventors: Jiwon Kang, Seoul (KR); Hyungtae Kim, Seoul (KR); Jonghyun Park, Seoul (KR); Kunil Yum, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 16/613,408

(22) PCT Filed: May 14, 2018

(86) PCT No.: PCT/KR2018/005501
§ 371 (c)(1),
(2) Date: Nov. 13, 2019

(87) PCT Pub. No.: WO2018/212530
PCT Pub. Date: Nov. 22, 2018

(65) Prior Publication Data
US 2020/0099435 A1    Mar. 26, 2020

Related U.S. Application Data

(60) Provisional application No. 62/505,977, filed on May 14, 2017.

(51) Int. Cl.
*H04B 7/06*    (2006.01)
*H04L 5/00*    (2006.01)
(Continued)

(52) U.S. Cl.
CPC ......... *H04B 7/0626* (2013.01); *H04L 5/0051* (2013.01); *H04W 24/10* (2013.01); *H04W 72/042* (2013.01); *H04W 72/0446* (2013.01)

(58) Field of Classification Search
CPC ....... H04B 7/0626; H04B 7/06; H04L 5/0051; H04L 5/0057; H04W 24/10; H04W 72/042; H04W 72/0446
See application file for complete search history.

(56) References Cited

U.S. PATENT DOCUMENTS 8,761,062 B2    6/2014 Chandrasekhar et al.
9,001,747 B2    4/2015 Ojala et al.
(Continued)

FOREIGN PATENT DOCUMENTS

KR    1020120124363    11/2012
KR    1020150050890    5/2015
WO    2012141421    10/2012

OTHER PUBLICATIONS

European Patent Office Application Serial No. 18803243.7, Search Report dated Oct. 21, 2020, 12 pages.
(Continued)

*Primary Examiner* — Dady Chery
(74) *Attorney, Agent, or Firm* — Lee, Hong, Degerman, Kang & Waimey

(57) ABSTRACT

The present specification provides a method for measuring and reporting channel state information (CSI) in a wireless communication system and a device for same. More particularly, in a method for reporting channel state information in a wireless communication system, the method which is carried out by means of a base station can comprise the steps of: transmitting CSI report configuration information associated with a CSI report to a terminal, wherein the CSI report configuration information comprises information indicating a time offset for the CSI report; transmitting a channel state
(Continued)

information reference signal (CSI-RS) to the terminal; transmitting control information, which is for triggering the CSI report, to the terminal; and receiving from the terminal the CSI report which is generated on the basis of the measurement with respect to the CSI-RS. Here, if the information indicating the time offset for the CSI report is configured in "0" value, the CSI-RS can be transmitted periodically or semi-continuously.

7 Claims, 15 Drawing Sheets

(51) Int. Cl.
*H04W 24/10* (2009.01)
*H04W 72/04* (2009.01)

(56) References Cited

U.S. PATENT DOCUMENTS

2017/0063503 A1 3/2017 Liu et al.
2020/0067583 A1* 2/2020 Shin .................... H04B 7/0486

OTHER PUBLICATIONS

Huawei, HiSilicon, "On the need for more flexible configurations related to CSI reporting," 3GPP TSG RAN WG1 Meeting #87, R1-1611237, Nov. 2016, 6 pages.
LG Electronics, "Discussion on CSI measurement framework," 3GPP TSG RAN WG1 Meeting #87, R1-1611822, Nov. 2016, 6 pages.
LG Electronics, "Discussion on CSI timing," 3GPP TSG RAN WG1 NR Ad-Hoc Meeting, R1-1700473, Jan. 2017, 5 pages.
Huawei, HiSilicon, "Independent and joint control of CSI-RS transmission and CSI reporting for NR MIMO," 3GPP TSG RAN WG1 #88 Meeting, R1-1701681, Feb. 2017, 7 pages.
Huawei, HiSilicon, "CR on Measurement reporting delay for shorten TTI and reduced processing time," 3GPP TSG-RAN WG4 Meeting #82bis, R4-1704278, Apr. 2017, 121 pages.
PCT International Application No. PCT/KR2018/005501, International Search Report dated Sep. 20, 2018, 3 pages.

* cited by examiner (a)

(b)

METHOD FOR MEASURING AND REPORTING CHANNEL STATE INFORMATION IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2018/005501, filed on May 14, 2018, which claims the benefit of U.S. Provisional Application No. 62/505,977, filed on May 14, 2017, the contents of which are all hereby incorporated by reference herein in their entirety.

TECHNICAL FIELD

The present disclosure relates to a wireless communication system, and more particularly, to a method for measuring and reporting channel state information (CSI) and an apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present specification provides a method of measuring and reporting CSI based on a CSI framework and an apparatus therefor.

In this regard, the present specification provides a method of calculating an estimated value for a CSI report using a preset time gap in consideration of a transmission time point of a CSI-RS and a CSI reporting instance.

The present specification further provides a method of calculating an estimated value for a CSI report by distinguishing whether a measurement restriction is set to a terminal.

The present specification further provides a method of setting offset (e.g., aperiodic CSI reporting offset) related to the CSI report.

The technical problems of the present disclosure are not limited to the above-described technical problems and the other technical problems will be understood by those skilled in the art from the following description.

Technical Solution

In a method of reporting channel state information (CSI) in a wireless communication system according to an embodiment of the present disclosure, the method performed by a base station includes transmitting CSI reporting setting information related to a CSI report to a terminal, wherein the CSI reporting setting information includes information indicating time offset for the CSI report; transmitting a channel state information reference signal (CSI-RS) to the terminal; transmitting control information for triggering the CSI report to the terminal; and receiving a CSI report generated based on measurement of the CSI-RS from the terminal, wherein the CSI-RS is transmitted periodically or semi-persistently, when information indicating time offset for the CSI report is set to a value '0'.

Further, in the method according to an embodiment of the present disclosure, the time offset for the CSI report may be a time gap between a time point in which the terminal receives control information for triggering the CSI report and a time point in which the terminal transmits the CSI report.

Further, in the method according to an embodiment of the present disclosure, the CSI-RS may be transmitted at a specific slot positioned before a slot in which control information for triggering the CSI report is transmitted. In this case, measurement of the CSI-RS may be performed before the terminal receives control information for triggering the CSI report.

Further, in the method according to an embodiment of the present disclosure, information indicating time offset for the CSI report may be set for each slot type, and the slot type may be set according to the number of symbols constituting one slot. For example, setting of information 'k' indicating time offset for the CSI report in a slot type configured with the M number of symbols may correspond to setting of information 'M/N*k' indicating time offset for the CSI report in an N symbol slot type configured with the N number of symbols.

A base station for receiving reporting of channel state information (CSI) in a wireless communication system according to an embodiment of the present disclosure includes a radio frequency module (RF module) for transmitting and receiving a radio signal; and a processor functionally connected to the RF module, wherein the processor controls to transmit CSI reporting setting information related to CSI report to a terminal, wherein the CSI reporting setting information includes information indicating time offset for the CSI report, to transmit a channel state information reference signal (CSI-RS) to the terminal, to transmit control information for triggering the CSI report to the terminal, to receive a CSI report generated based on measurement of the CSI-RS from the terminal, wherein the CSI-RS is transmitted periodically or semi-persistently, when the information indicating time offset for the CSI report is set to a value '0'.

A method in which a terminal reports channel state information (CSI) in a wireless communication system according to an embodiment of the present disclosure includes receiving CSI report setting information related to a CSI report from a base station, wherein the CSI reporting setting information includes information indicating time offset for the CSI report; receiving a channel state information reference signal (CSI-RS) from the base station; receiving control information for triggering the CSI report from the base station; and reporting CSI generated based on measurement of the CSI-RS to the base station, wherein the CSI-RS is transmitted periodically or semi-persistently, when the information indicating time offset for the CSI report is set to a value '0'.

Advantageous Effects

According to an embodiment of the present disclosure, by setting a time gap for calculating a measurement value of a CSI report for each terminal (e.g., according to a terminal capability), non-uniform flexible CSI measurement and reporting can be performed.

Further, according to an embodiment of the present disclosure, by performing CSI measurement and reporting in consideration of a CSI computation capability of a UE, a nearest channel estimation value or interference estimation value allowed for the UE can be calculated.

The effects of the present disclosure are not limited to the above-described effects and the other effects will be understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR INVENTION

Figure 1:
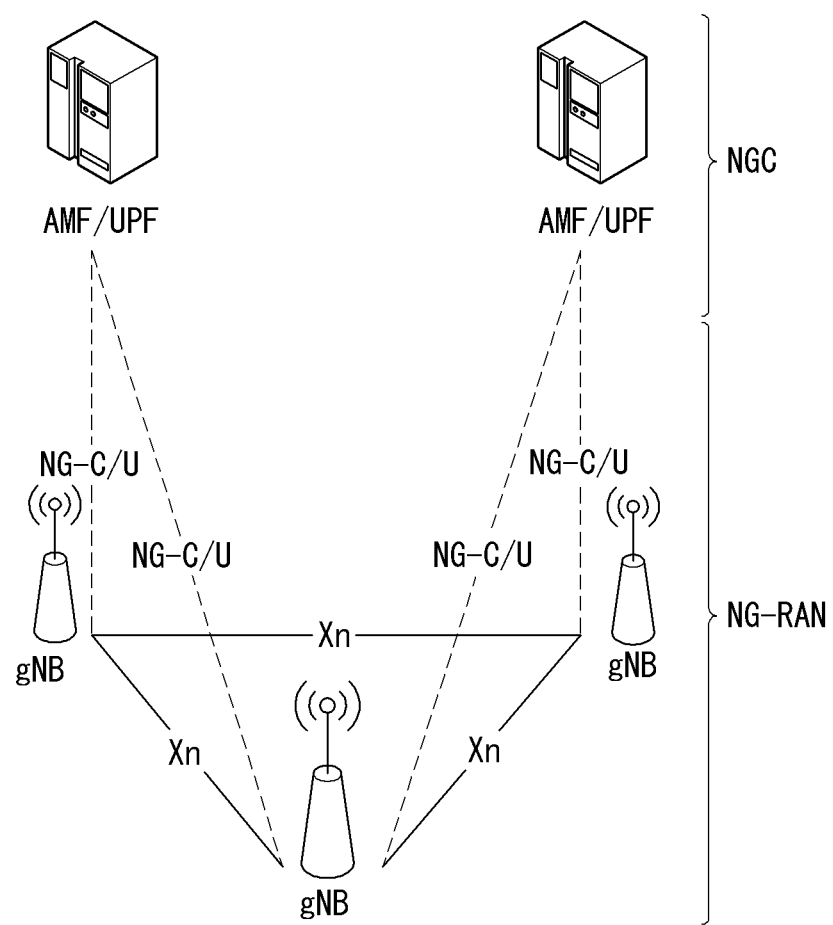
FIG. 1 illustrates an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, general NB, gNodeB (gNB), and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA).

CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=100) \cdot T_s=1$ ms. In this case, there may be a set of UL frames and a set of DL frames.

Figure 2:
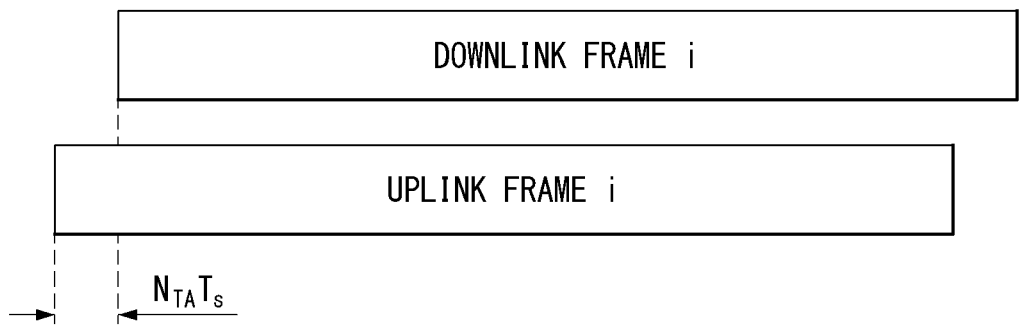
FIG. 2 illustrates a relationship between an uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
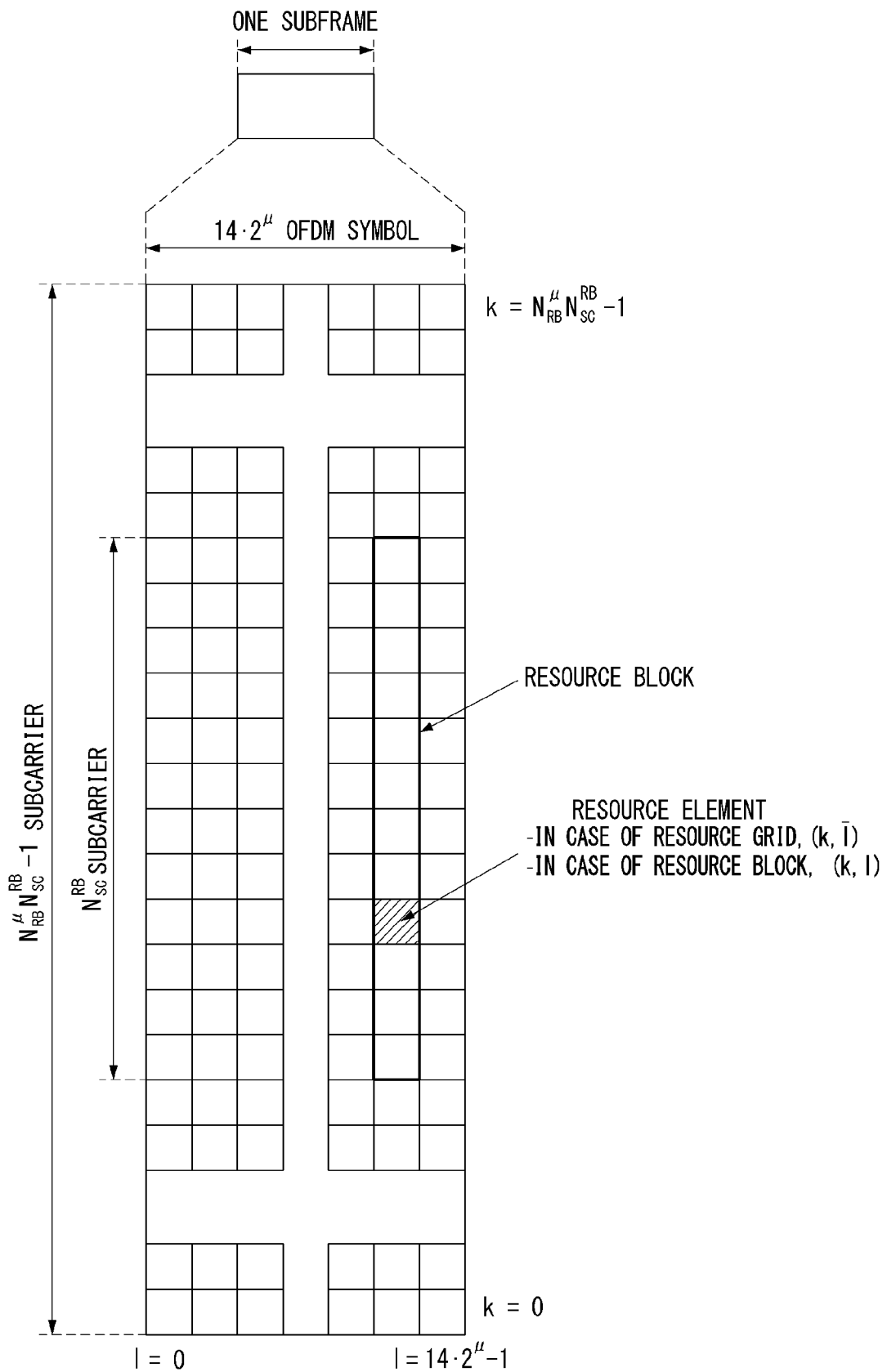
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 4:
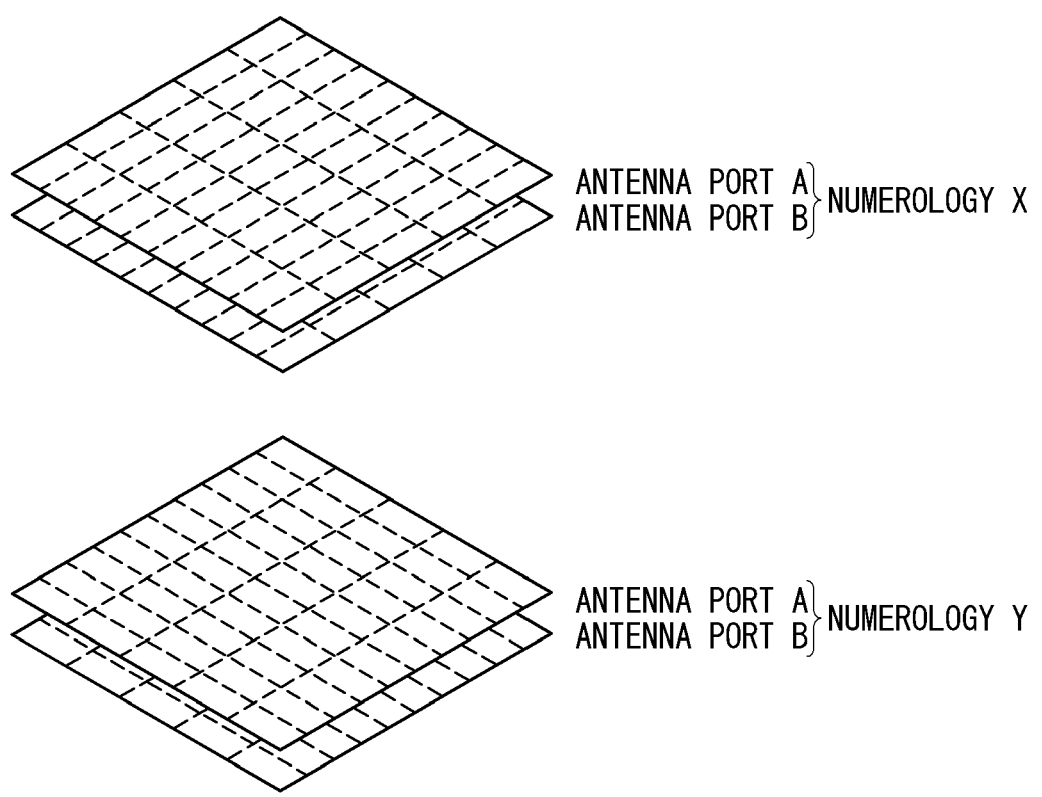
FIG. 4 illustrates examples of resource grids for each antenna port and numerology to which a method proposed in this specification may be applied.

In this case, as illustrated in FIG. 4, one resource grid may be configured for the numerology μ and an antenna port p.

FIG. 4 shows an example of antenna ports and ringer-specific resource grids to which the method proposed herein may be applied.

Each element of the resource grid for the numerology μ and the antenna port p is indicated as a resource element, and may be uniquely identified by an index pair (k,l̄). Herein, k=0, . . . , $N_{RB}^{\mu}N_{sc}^{RB}-1$ is an index in the frequency domain, and l̄=0, . . . , $2^{\mu}N_{symb}^{(\mu)}-1$ indicates a location of a symbol in a subframe. To indicate a resource element in a slot, the index pair (k,l) used. Herein, l=0, . . . , $N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: A set of L1/L2 procedures for obtaining and maintaining a set of TRP(s) and/or UE beams that may be used for DL and UL transmission/reception, including at least:

Beam determination: operation of the TRP(s) or the UE selecting transmission/reception beam thereof.

Beam measurement: operation of the TRP(s) or the UE selecting transmission/reception beam thereof.

Beam reporting: operation in which the UE reports information of a beamformed signal based on beam measurement.

Beam sweeping: operation of covering a spatial region using a transmitted and/or received beam for a time interval in a predetermined scheme.

Further, Tx/Rx beam correspondence in the TRP and the UE is defined as follows:

The Tx/Rx beam correspondence in the TRP is maintained if at least one of the followings is satisfied:

The TRP may determine a TRP reception beam for uplink reception based on the UE's downlink measurement for one or more transmission beams of the TRP.

The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

A capability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. Here, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting and M≥1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating the selected beam

L1 measurement reporting time domain operation (e.g., aperiodic operation, periodic operation, semi-persistent operation)

frequency granularity when multiple frequency granularities are supported

Resource setting that includes at least:

time domain operation (e.g., aperiodic operation, periodic operation, semi-persistent operation)

RS type: at least NZP CSI-RS at least one CSI-RS resource set. Each CSI-RS resource set includes K≥1 CSI-RS resources (Some parameters of K CSI-RS resources may be the same. For example, port number, a time domain operation, density, and periodicity).

Further, NR supports a next beam report considering L group with L>1.

Information indicating minimal groups

Measurement quantity (L1 RSRP and CSI reporting support (when the CSI-RS is for CSI acquisition)) for N1 beam If applicable, information indicating N1 DL transmission beams The group-based beam reporting as described above may be configured on a UE-by-UE basis. Further, the group-based beam reporting may be turned off on the UE-by-UE basis (e.g., when L=1 or N1=1).

NR supports that UE may trigger a mechanism which the UE recovers from the beam failure.

A beam failure event occurs when a quality of a beam pair link of an associated control channel is sufficiently low (e.g., a comparison with a threshold, a timeout of an associated timer). The mechanism recovered from the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. Here, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, the information also indicates the RS antenna port QCLed with the DMRS antenna port. A different set of DMRS antenna ports for a DL data channel may be represented as a different set of RS antenna ports and a QCL.

Hereinafter, prior to describing the methods proposed in this specification in detail, contents directly or indirectly related to the methods proposed in this specification will be briefly described first.

In next-generation communication including 5G, New Rat (NR), etc., as more and more communication devices require a larger communication capacity, there is a need for enhanced mobile broadband communication as compared with the existing radio access technology.

Further, massive machine type communications (MTCs), which provide various services anytime and anywhere by connecting many devices and objects, are one of the major issues to be considered in the next generation communication.

In addition, a communication system design or structure considering a service/UE sensitive to reliability and latency is being discussed.

The introduction of next generation radio access technology (RAT) considering enhanced mobile broadband communication (eMBB), massive MTC (mMTC), ultra-reliable and low latency communication (URLLC) is currently discussed, and in this specification, the technology is called 'new RAT (NR)' for convenience.

Self-Contained Slot Structure

Figure 5:
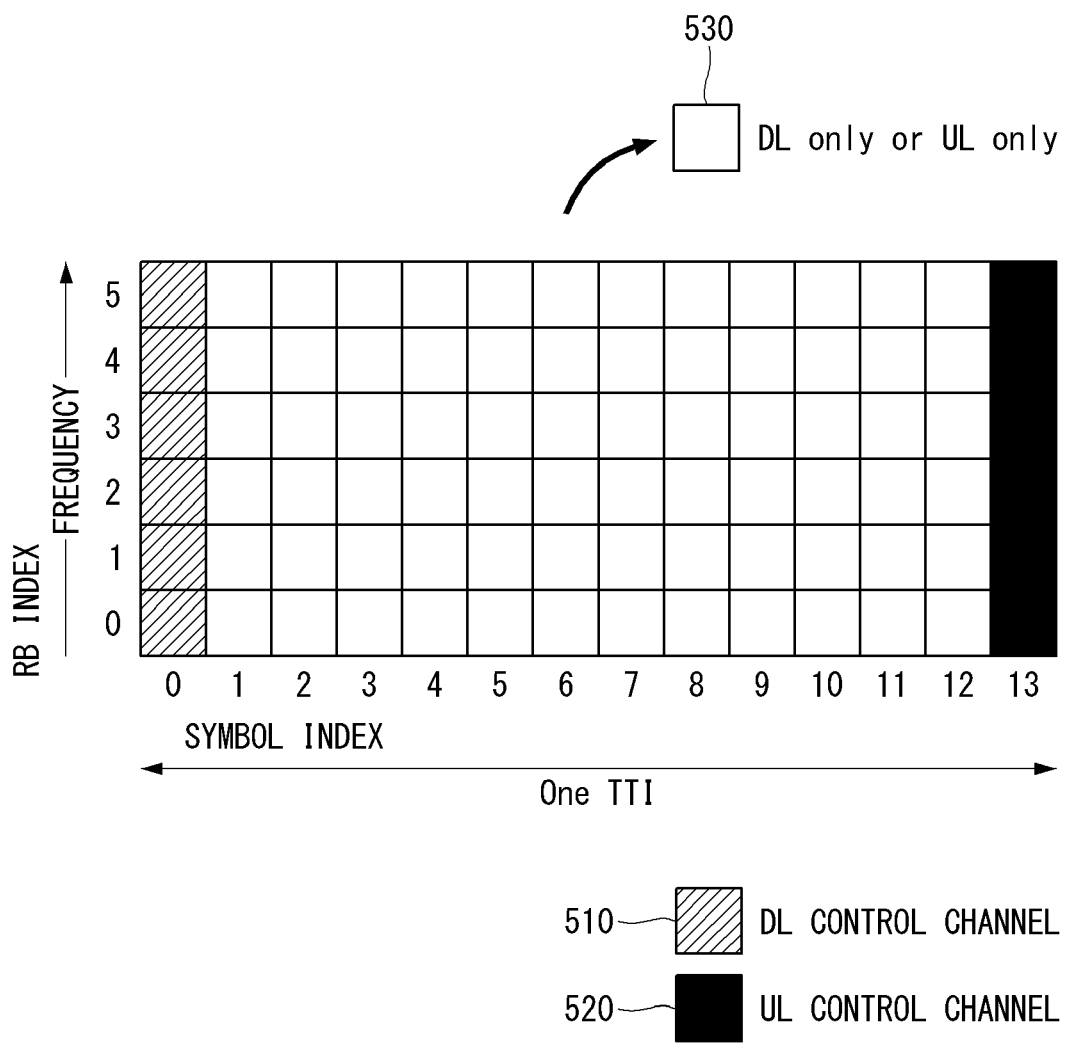
FIG. 5 is a diagram illustrating one example of a self-contained slot structure to which the method proposed in the present specification may be applied.

In order to minimize the latency of data transmission in a TDD system, the fifth generation new RAT considers a self-contained slot structure as shown in FIG. 5.

That is, FIG. 5 is a diagram illustrating one example of a self-contained slot structure to which the method proposed in this specification may be applied.

In FIG. 5, a dashed area 510 indicates a downlink control area and a black area 520 indicates an uplink control area.

An unmarked area 530 may be used for downlink data transmission or for uplink data transmission.

Such a structure may be characterized in that DL transmission and UL transmission are sequentially performed in one slot, and DL data may be transmitted in one slot, and UL ACK/NACK may also be transmitted and received.

Such a slot may be defined as a 'self-contained slot'.

That is, through such a slot structure, it takes less time for the eNB to retransmit data to the UE when a data transmission error occurs, thereby minimizing the latency of final data transmission.

In such a self-contained slot structure, there is a need for a time gap between the eNB and the UE for the conversion process from the transmission mode to the reception mode or from the reception mode to the transmission mode.

To this end, some OFDM symbols at the time of switching from DL to UL in the slot structure are configured to a guard period (GP).

Analog Beamforming

In the millimeter wave (mmW), the wavelength is shortened, so that a plurality of antenna elements may be installed in the same area.

That is, a total of 64 (8×8) antenna elements may be installed in a 2-dimension array at a 0.5 lambda (wavelength) interval on a panel of 4×4 cm with a wavelength of 1 cm in a 30 GHz band.

Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource.

However, when the TXRUs are installed on all of approximately 100 antenna elements, there is a problem that effectiveness is deteriorated in terms of costs.

Therefore, a method of mapping a plurality of antenna elements to one TXRU and adjusting a direction of a beam using an analog phase shifter is considered.

Such an analog beamforming method has a disadvantage in that frequency selective beamforming may not be performed by making only one beam direction in all bands.

A hybrid BF (HBF) with B TXRUs, which is an intermediate form of digital BF and analog BF, and fewer than Q antenna elements, may be considered.

In the HBF, although there is a difference depending on a connection method of B TXRUs and Q antenna elements, the number of directions of the beams that may be transmitted at the same time is limited to B or less.

Figure 6:
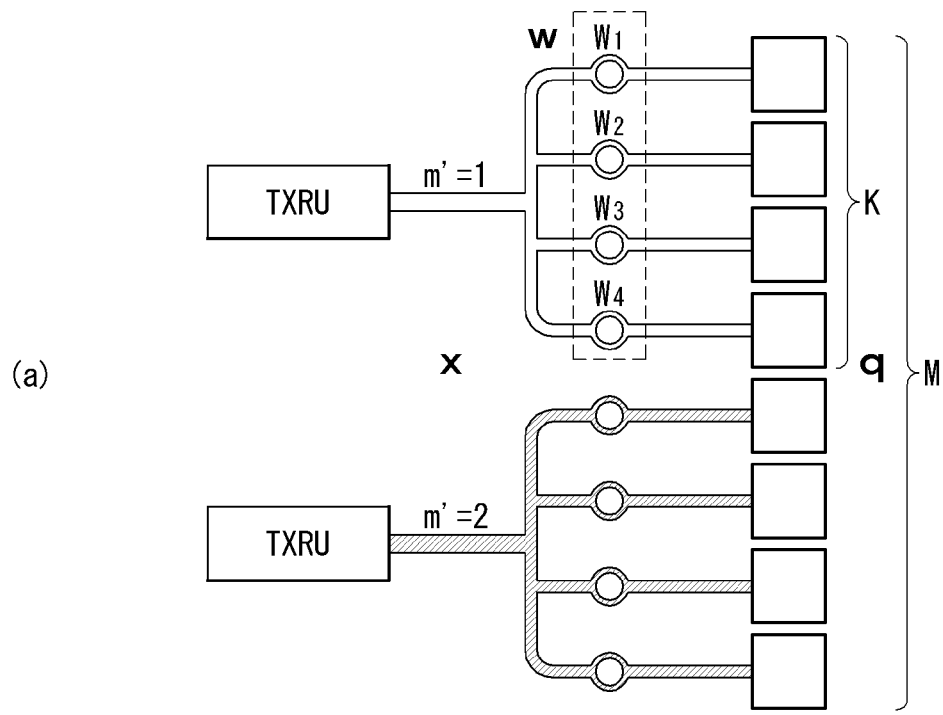
FIG. 6 illustrates examples of a connection scheme of a TXRU and an antenna element to which a method proposed in this specification may be applied.
Figure 6:
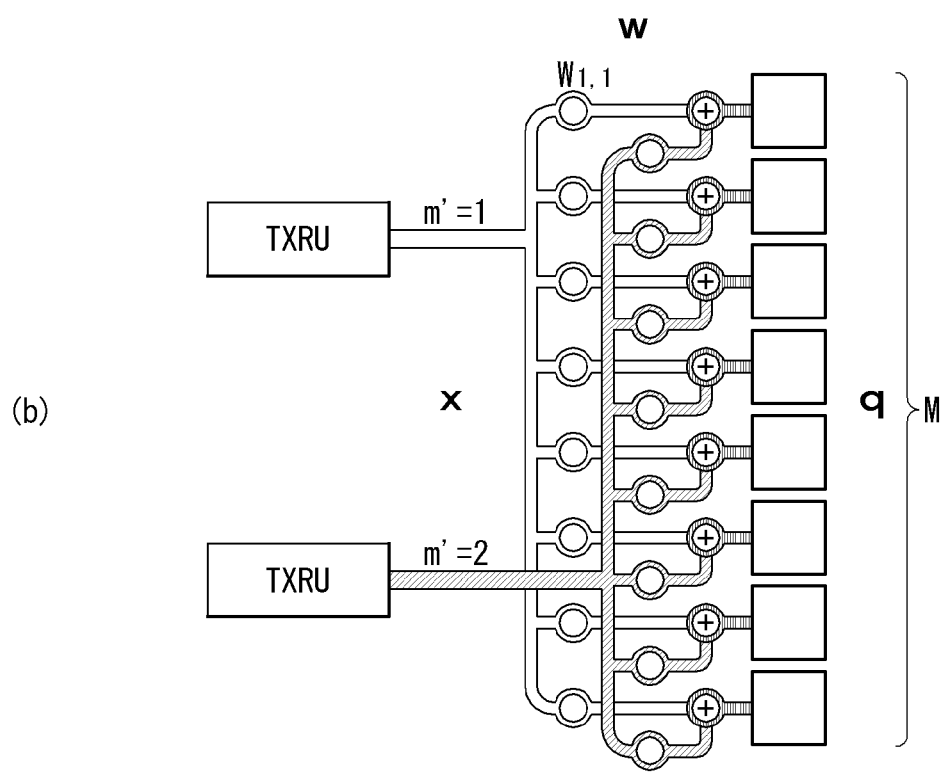

FIG. 6 illustrates examples of a connection scheme of a TXRU and an antenna element to which a method proposed in this specification may be applied.

Here, a TXRU virtualization model shows a relationship between an output signal of the TXRUs and an output signal of the antenna elements.

FIG. 6(*a*) illustrates an example of a scheme in which the TXRU is connected to a sub-array.

Referring to FIG. 6(*a*), the antenna element is connected only to one TXRU. Unlike FIG. 6(*a*), FIG. 6(*b*) illustrates a scheme in which the TXRU is connected to all antenna elements.

That is, in the case of FIG. 6(*b*), the antenna element is connected to all TXRUs.

In FIG. 6, W represents a phase vector multiplied by an analog phase shifter.

In other words, a direction of analog beamforming is determined by W. Here, mapping of CSI-RS antenna ports and TXRUs may be 1-to-1 or 1-to-many.

CSI Feedback

In a 3GPP LTE/LTE-A system, user equipment (UE) is defined to report channel state information (CSI) to a base station (BS).

Here, the channel state information (CSI) collectively refers to information that may indicate the quality of a radio channel (or also referred to as a link) formed between the UE and the antenna port.

For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI.

The PMI is a value reflecting a channel space characteristic and represents a preferred precoding index preferred by the UE based on a metric such as SINR.

The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process.

Here, the CSI process is constituted by a CSI-RS for signal quality measurement from the BS and a CSI-interference measurement (CSI-IM) resource for interference measurement.

Reference Signal (RS) Virtualization

In the mmW, it is possible to transmit a PDSCH only in one analog beam direction at a time by analog beamforming.

Therefore, the eNB transmits data only to a small number of some UEs in a specific direction.

Therefore, if necessary, the analog beam direction is differently configured for each antenna port so that data transmission may be simultaneously performed to a plurality of UEs in several analog beam directions.

Figure 7:
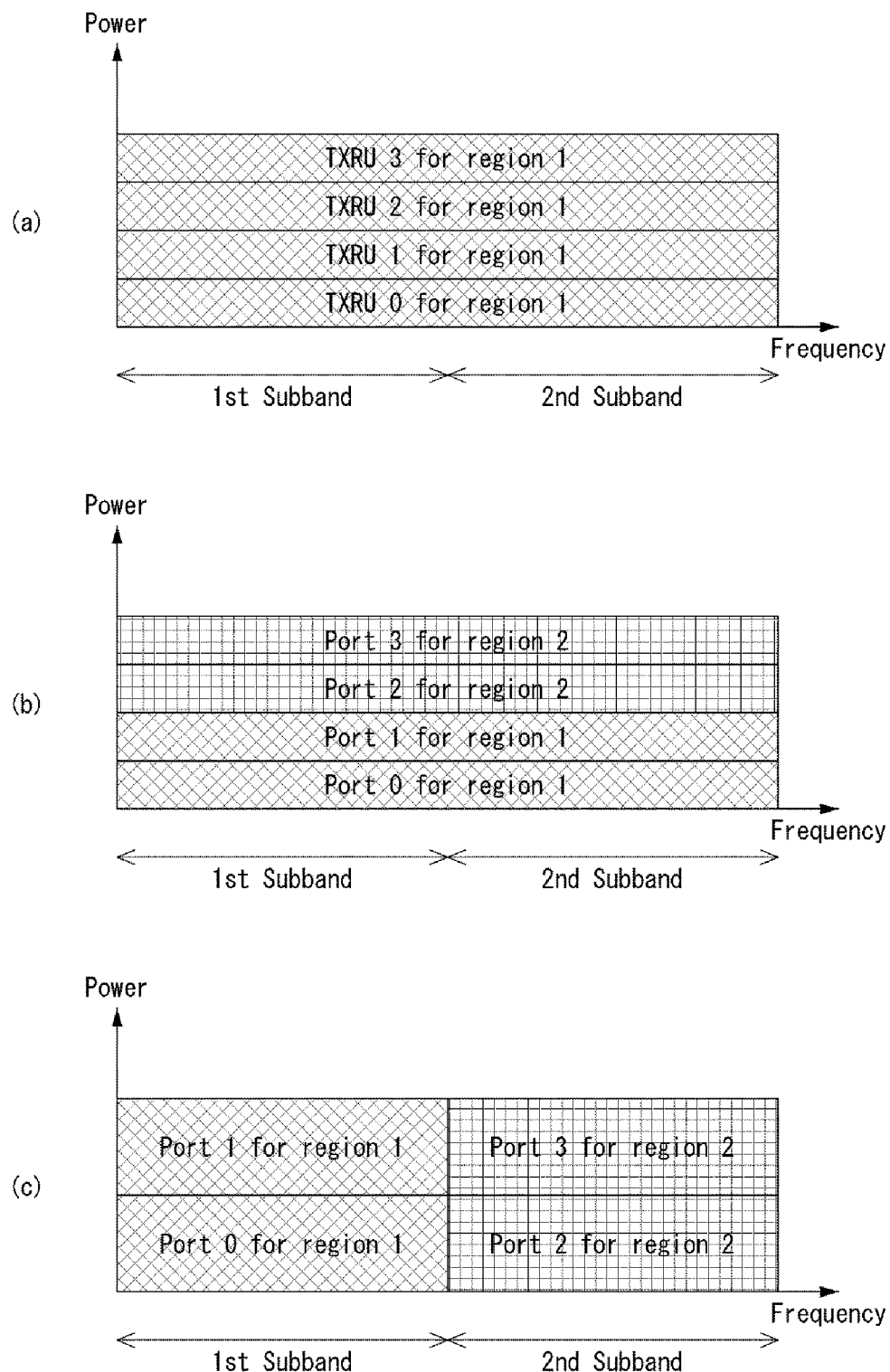
FIG. 7 illustrates various examples of a service area for TXRU to which a method proposed in this specification may be applied.

FIG. 7 illustrates various examples of a service area for TXRU to which a method proposed in this specification may be applied.

In FIG. 7, 256 antenna elements are divided into 4 parts to form 4 sub-arrays, and the structure of connecting the TXRU to each sub-array will be described as an example.

When each sub-array is constituted by a total of 64 (8×8) antenna elements in the form of a 2-dimensional array, specific analog beamforming may cover an area corresponding to a 15-degree horizontal angle area and a 15-degree vertical angle area.

That is, the zone where the eNB should be served is divided into a plurality of areas, and services are provided one by one at a time.

In the following description, it is assumed that the CSI-RS antenna ports and the TXRUs are 1-to-1 mapped.

Therefore, it may be interpreted that the antenna port and the TXRU have the same meaning as the following description.

If all TXRUs (antenna ports, sub-arrays) have the same analog beamforming direction as illustrated in FIG. 7(a), the throughput of the corresponding zone may be increased by forming digital beam with higher resolution.

Further, it is possible to increase the throughput of the corresponding zone by increasing the RANK of the transmission data to the corresponding zone.

In addition, as illustrated in FIG. 7(b), if each TXRU (antenna port, sub-array) has a different analog beamforming direction, the data may be transmitted simultaneously to UEs distributed in a wider area in the subframe (SF).

As illustrated in FIG. 7(b), two of four antenna ports are used for PDSCH transmission to UE1 in region 1 and the remaining two antenna ports are used for PDSCH transmission to UE2 in Area 2.

Further, FIG. 7(b) illustrates an example in which PDSCH 1 transmitted to UE 1 and PDSCH 2 transmitted to UE 2 are subjected to spatial division multiplexing (SDM).

Unlike this, as illustrated in FIG. 7(c), PDSCH 1 transmitted to UE 1 and PDSCH 2 transmitted to UE 2 may be transmitted by frequency division multiplexing (FDM).

Among a scheme of servicing one area using all the antenna ports and a scheme of servicing many areas at the same time by dividing the antenna ports, a preferred scheme may be changed according to the RANK and the MCS servicing to the UE for maximizing the cell throughput.

Further, the preferred scheme is changed according to the amount of data to be transmitted to each UE.

The eNB calculates a cell throughput or scheduling metric which may be obtained when one area is serviced using all the antenna ports, and calculates the cell throughput or scheduling metric which may be obtained when two areas are serviced by dividing the antenna ports.

The eNB compares the cell throughput or the scheduling metric which may be obtained by each scheme to select the final transmission scheme.

As a result, the number of antenna ports participating in PDSCH transmission is changed by SF-by-SF.

In order for the eNB to calculate the transmission MCS of the PDSCH according to the number of antenna ports and reflect the calculated transmission MCS to a scheduling algorithm, the CSI feedback from the appropriate UE is required.

Beam Reference Signal (BRS)

Beam reference signals are transmitted on one or more antenna ports (p={0, 1, . . . , 7}).

Reference sequence n(m) is defined by Equation 2 in relation with generation of a sequence of the BRSs.

[Equation 2]

$$r_l(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 8 \cdot (N_{RB}^{max,DL} - 18) - 1$$

In Equation 2, 1 as 0 to 13 represents an OFDM symbol number. Further, c(i) denotes a pseudo-random sequence and a pseudo-random sequence generator may be initialized to Equation 3 at the beginning of each OFDM symbol.

$$C_{init} = 2^{10} \cdot (7 \cdot (n_s+1)+\gamma+1) \cdot (2 \cdot N_{ID}^{cell}+1)+2 \cdot N_{ID}^{cell}+1 \quad \text{[Equation 3]}$$

Beam Refinement Reference Signal

Further, in relation with the beam refinement reference signal, the beam refinement reference signal is transmitted through antenna ports of up to 8 antenna ports (p=600 to 607).

In relation with the sequence generation of the beam refinement reference signal, reference signal $r_{l,n_s}(m)$ is generated as shown in Equation 4.

[Equation 4]

$$r_{l,n_s}(m) = \frac{1}{\sqrt{2}}(1 - 2c(2m)) + j\frac{1}{\sqrt{2}}(1 - 2c(2m+1)),$$

$$m = 0, 1, \ldots, \left\lfloor \frac{3}{8}N_{RB}^{max,DL} \right\rfloor - 1$$

In Equation 4, $n_s$ represents a slot number in a radio frame and 1 represents the OFDM symbol number in the slot. c(n) denotes the pseudo-random sequence and the pseudo-random sequence generator is initialized to Equation 5 at the beginning of each OFDM symbol.

$$c_{init} = 2^{10}(7(\bar{n}+1)+l+1)(2N_{ID}^{BRRS}+1)+2N_{ID}^{BRRS}+1\bar{n}_s = n_s \mod 20 \quad \text{[Equation 5]}$$

In Equation 5, $N_{ID}^{BRRS}$ is configured in the UE through an RRC

DL Phase Noise Compensation Reference Signal

A phase noise compensation reference signal associated with xPDSCH (i.e., the PDSCH supported by the NR system) is transmitted at the antenna port(s) p=60 and/or p=61 via A signaling in A DCI format. Further, the phase noise compensation reference signal is present and/or valid only for the xPDSCH transmission associated with the antenna port, and is transmitted only in the physical resource blocks and symbols to which an sPDSCH is mapped. Further, the phase noise compensation reference signal is the same in all symbols corresponding to xPDSCH allocation.

Reference sequence r(m) is defined by Equation 6 in relation with generation of the sequence of the phase noise compensation reference signal.

[Equation 6]

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, \lfloor N_{RB}^{max,DL}/4 \rfloor - 1$$

In Equation 6, c(i) denotes the pseudo-random sequence and the pseudo-random sequence generator is initialized to Equation 7 at the beginning of each subframe.

$$c_{init} = (\lfloor n_s/2 \rfloor + 1) \cdot (2n_{ID}^{SCID} + 1) \cdot 2^{16} + n_{SCID}$$ [Equation 7]

In Equation 7, in the case of transmission of the xPDSCH, $n_{SCID}$ is given by a DCI format related with the transmission of the xPDSCH and otherwise, $n_{SCID}$ is set to 0.

Further, in the case of 3-dimension multiple-input multiple-output (3D-MIMO) or full-dimension multiple-input multiple-output (MIMO) technology, an active antenna system (AAS) having a 2-dimensional planar array structure may be used.

Figure 8:
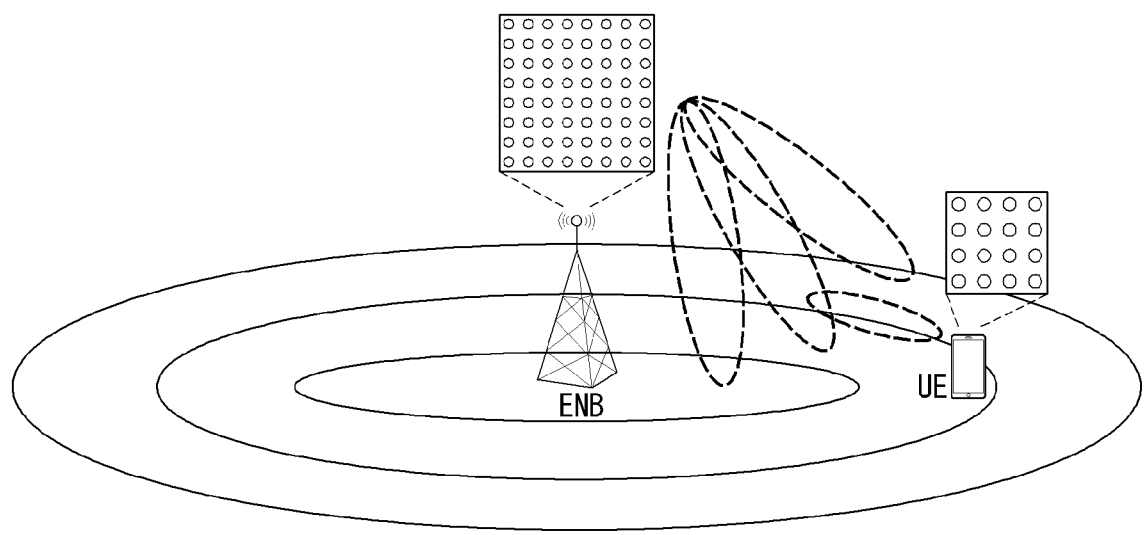
FIG. 8 illustrates an example of an MIMO system using a 2D plane array structure to which a method proposed in this specification may be applied.

FIG. 8 illustrates an example of an MIMO system using a 2D plane array structure to which a method proposed in this specification may be applied.

Through the 2D plane array structure, a large number of antenna elements may be packed within available base station type of elements and an adaptive electronic capability in a 3D space may be provided.

In relation with an MIMO design of the NR system, a CSI framework for measuring and reporting a channel state between the eNB and the UE is considered.

The present specification proposes a CSI reporting method based on a CSI framework (or CSI acquisition framework) described below. Specifically, the present specification proposes a method of determining a measurement gap (or time point) of CSI measurement (or estimation) based on CSI reporting setting of the CSI framework. In other words, in the present specification, a method of determining CSI-RS(s) used for CSI measurement and/or a time gap of CSI measurement is described.

Further, although a method proposed in the present specification has been described based on a CSI reporting method, the method may be commonly applied to a general beam reporting method as well as the CSI reporting method. For example, a method proposed in the present specification, i.e., a method of performing reporting in consideration of a computation time (or decoding time, etc.) of a terminal may be equally or similarly applied to beam reporting based on CRI, Synchronization Signal Block (SSB)-ID, and/or L1-RSRP.

First, the CSI framework considered in the NR system will be described in detail.

The CSI framework may mean that a CSI related procedure is defined using CSI reporting setting, resource setting, CSI measurement setting, and CSI measurement setting unlike a legacy LTE system in which the CSI related procedure is defined only in the form of a CSI process. Accordingly, in the NR system, the CSI related procedures may be performed in a more flexible scheme according to a channel and/or resource situation.

That is, a configuration for the CSI related procedure in the NR system may be defined by combining the CSI reporting setting, the resource setting, and the CSI measurement setting.

For example, the UE may be configured to acquire the CSI by N≥1 CSI reporting settings, M≥1 resource settings, and one CSI measurement setting. Here, the CSI measurement setting may mean setting information for a link between N CSI reporting settings and M resource settings. Further, here, the resource settings include reference signal (RS) settings and/or Interference Measurement settings (IM settings).

Figure 9:
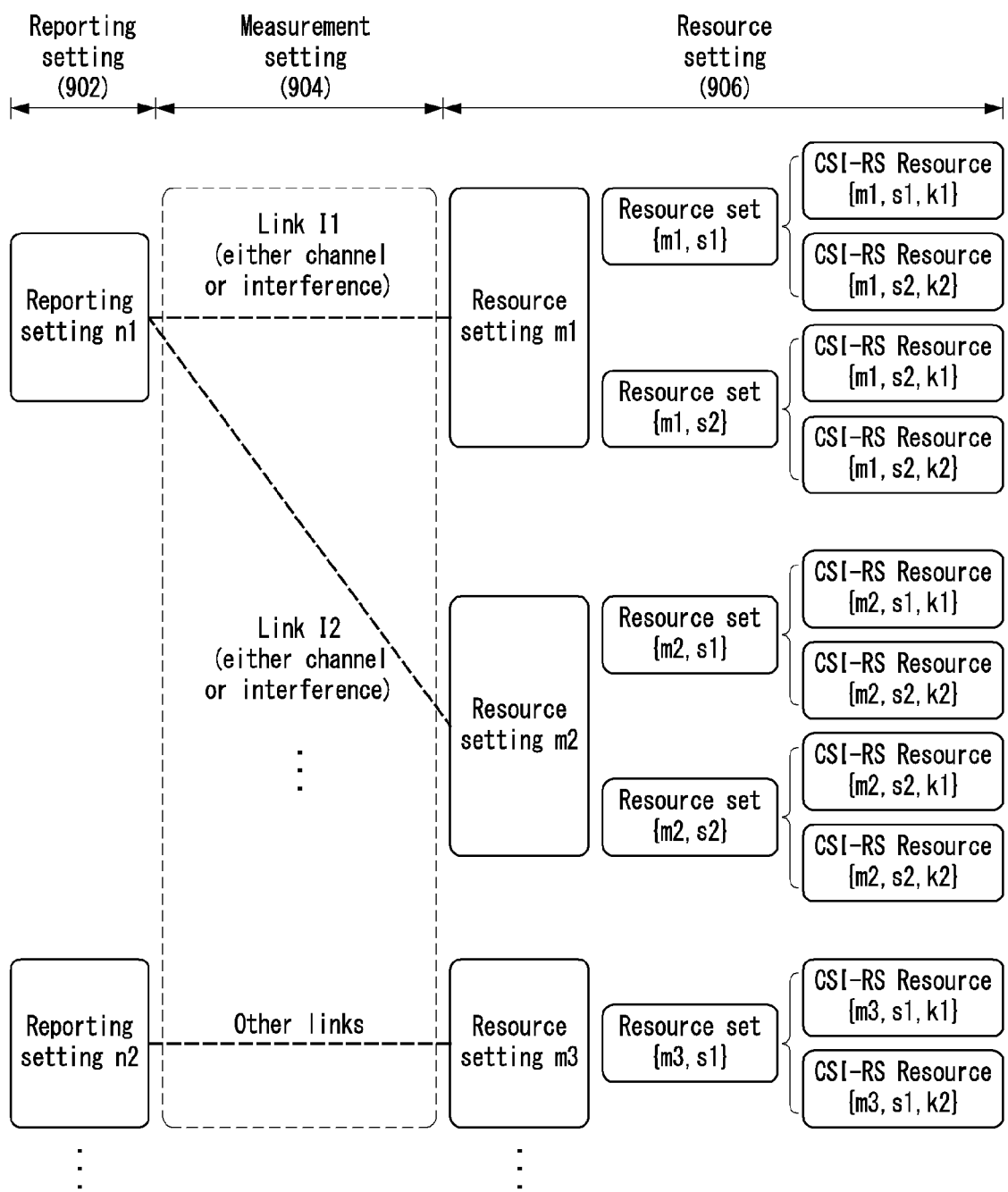
FIG. 9 illustrates an example of a CSI framework considered in an NR system to which a method proposed in this specification may be applied.

FIG. 9 illustrates an example of a CSI framework considered in an NR system to which a method proposed in this specification may be applied.

Referring to FIG. 9 may be configured by reporting setting 902, measurement setting 904, and resource setting 906. Here, the reporting setting may mean the CSI reporting setting, the measurement setting may mean the CSI measurement setting, and the resource setting may mean the CSI-RS resource setting.

As illustrated in FIG. 9, the reporting setting 902 may be constituted by N (N≥1) report settings (e.g., Reporting setting n1, Reporting setting n2, etc.).

Further, the resource setting 906 may be constituted by M (M≥1) resource settings (e.g., Resource setting m1, Resource setting m2, Resource setting m3, etc.). Here, each resource setting may include S (S≥1) resource sets and each resource set may include K (K≥1) CSI-RSs.

Further, the measurement setting 904 may mean setting information indicating the link between the reporting setting and the resource setting and a measurement type configured for the corresponding link. In this case, each measurement setting may include L (L≥1) links. For example, the measurement setting may include setting information for a link (Link 11) between Reporting setting n1 and Resource setting m1, setting information for a link (Link 12) between Reporting setting n1 and Resource setting m2, and the like.

In this case, each of Link 11 and Link 12 may be configured as any one of a channel measurement link or an interference measurement link. Moreover, Link 11 and/or Link 12 may be configured for rate matching or other purposes.

In this case, one or more CSI reporting settings within one CSI measurement setting may be selected dynamically via Layer 1 (L2) signaling or L2 (Layer 2) signaling. Further, one or more CSI-RS resource sets selected from at least one resource setting and one or more CSI-RS resources selected from at least one CSI-RS resource set are also dynamically selected via the L1 or L2 signaling.

Hereinafter, the CSI reporting setting, the resource setting (i.e., CSI-RS resource setting), and the CSI measurement setting constituting the CSI framework considered in the NR system will be described.

CSI Reporting Setting

First, the CSI reporting setting may mean information for setting a type of CSI reporting which the UE is to perform with respect to the eNB, information included in the CSI reporting, and the like.

For example, the CSI reporting setting may include a time-domain behavior type of a time domain, frequency granularity, CSI parameters (e.g., Precoding Matrix Indicator (PMI), Rank Indicator (RI), and Channel Quality Indicator (CQI)) to be reported, a CSI type (e.g., CSI Type 1 or 2, CSI with high complexity, or CIS with low complexity), a codebook configuration including codebook subset restriction, a measurement restriction configuration, and the like.

In this specification, the operation type of the time domain may mean an aperiodic operation, a periodic operation, or a semi-persistent operation.

In this case, a setting parameter(s) for the CSI reporting setting may be configured (or indicated) through higher layer signaling (e.g., RRC signaling).

Resource Setting

Next, the resource setting may mean information for setting resource to be used for CSI measurement and reporting. For example, the resource setting may include an operation pattern of the time domain, a type (e.g., Non-Zero Power CSI-RS (NZP CSI-RS), Zero Power CSI-RS (ZP CSI-RS), DMRS, etc.) of the RS, a resource set constituted by K resources, and the like.

As mentioned above, each resource setting may include one or more resource sets and each resource set may include one or more resources (e.g., CSI-RS resources). Further, the resource setting may include a setting for a signal for channel measurement and/or interference measurement.

As an example, each resource setting may include setting information for S resource sets (e.g., CSI-RS resource sets) and may also include setting information for K resources for each resource set. In this case, each resource set may correspond to sets differently selected from a pool of all CSI-RS resources configured for the UE. Further, the setting information for each resource may include information to a resource element, the number of ports, the operation type of the time domain, and the like.

Alternatively, as another example, each resource setting may include setting information for S CSI-RS resources and/or K CSI-RS resources of ports of a number equal to or smaller than each CSI-RS resource.

In this case, a CSI-RS RE mapping pattern of an N-port CSI-RS resource may be constituted by one or more CIS-RS mapping patterns of CSI-RS resources of the same or smaller number. Here, the CSI-RS RS mapping pattern may be defined in the slot and spanned to multiple configurable consecutive/inconsecutive 01-DM symbols.

In this case, a setting parameter(s) for the resource setting may be configured through higher layer signaling (e.g., RRC signaling).

CSI Measurement Setting

Next, the CSI measurement setting may mean setting information indicating which measurement the UE is to perform with respect to a specific CSI reporting setting and a specific resource setting mapped thereto for the CSI reporting. That is, the CSI measurement setting may include information on the link between the CSI reporting setting and the resource setting and may include information indicating a measurement type for each link. Further, the measurement type may mean channel measurement, interference measurement, rate matching, etc.

As an example, the CSI measurement setting may include information indicating the CSI reporting setting, information indicating the resource setting, and a setting for a reference transmission scheme in the case of the CQI. In this regard, the UE may support L≥1 CSI measurement settings and an L value may be set according to a capability of the corresponding UE.

In this case, one CSI reporting setting may be connected to one or more resource settings and multiple CSI reporting settings may be connected to the same resource setting.

In this case, a setting parameter(s) for the CSI measurement setting may be configured through higher layer signaling (e.g., RRC signaling).

Further, in relation with the CSI reporting setting, the resource setting, and the CSI measurement setting, agreements depending on the operation type of the time domain are as follows.

First, in the case of the periodic CSI-RS (i.e., a case where transmission of the CSI-RS is periodically performed), semi-persistent CSI reporting may be activated/deactivated by MAC CE and/or downlink control information (DCI). Unlike this, the aperiodic CSI reporting may be triggered by the DCI, however, in this case, additional signaling configured to the MAC CE may be required.

Next, in the case of the semi-persistent CSI-RS (i.e., a case where transmission of the CSI-RS is semi-persistently performed), periodic CSI reporting is not supported. On the contrary, semi-persistent CSI reporting may be activated/deactivated by the MAC-CE and/or DCI and the semi-persistent CSI-RS may be activated/deactivated by the MAC-CE and/or DCI. Further, in this case, the aperiodic CSI reporting may be triggered by the DCI and the semi-persistent CS-RS may be activated/deactivated by the MAC-CE and/or DCI.

Last, in the case of the aperiodic CSI-RS (i.e., a case where transmission of the CSI-RS is aperiodically performed), the periodic (and semi-persistent) CSI reporting is not supported. On the contrary, the aperiodic CSI reporting may be triggered by the DCI and the aperiodic CS-RS may be triggered by the DC and/or MAC-CE.

It is to be understood that the embodiments described in this specification are just distinguished for easy description and some configurations or features of certain embodiments may be included in other embodiments or may be replaced with corresponding configurations or features of other embodiments. For example, hereinafter, schemes to be described in first to third embodiments may be applied to a scheme to be described in a fourth embodiment and vice versa.

Hereinafter, setting methods which may be considered with respect to the resource setting (i.e., CSI-RS resource setting), CSI measurement setting, and CSI reporting setting will be described.

First Embodiment—Setting Method Considerable for Resource Setting

First, in relation with the above-described resource setting, the CSI-RS resource setting may include two types of RS types such as NZP CSI-RS and ZP CSI-RS (for reference, the CSI-RS mentioned in this specification may be applied to both the NZP CSI-RS and the ZP CSI-RS).

Both the NZP CSI-RS resource and the ZP CSI-RS resource may be set within the corresponding resource settings because the use of a specific resource is indicated within each of the CSI measurement settings. Here, the ZP CSI-RS may be used for interference estimation (i.e., interference measurement) or rate matching for data channels (e.g., NR-PDSCH). In addition, the NZP CSI-RS may be applied not only for channel estimation (i.e., channel measurement) but also for interference estimation.

Further, the NZP CSI-RS included in the resource setting may be applied to both CSI acquisition and beam management.

Specifically, the CSI-RS resources for beam management may also be included in a resource setting for a unified operation for analog beam selection and digital beam selection. One of the main functions of CSI acquisition is beam selection through UE feedback information such as PMI and CSI-TE Resource Indication (CRI). The purpose of DL beam management may also be to select the beam(s) and the TRP transmission beam may be selected via the UE feedback information. Only the additional function of DL beam management is to select a UE reception beam, but the UE reception beam selection may be supported simply by transmitting a plurality of repeated transmit beams via CSI-RS symbols or sub-symbols. As a result, the above-described CSI framework may also be used for the purpose of beam management.

For such a resource setting, three time-domain operation types may be supported, such as aperiodic CSI-RS, semi-persistent CSI-RS, and periodic CSI-RS. In this case, the three types of time-domain operation types described above may be commonly applied to both the NZP CSI-RS and the ZP CSI-RS. In this regard, an aperiodic Interference Measurement Resource (IMR) and a semi-persistent IMR may provide high interference estimation accuracy and high flexibility for a system design, considering a dynamic TDD operation and forward compatibility of the NR system.

Further, the resource setting may include a CSI-RS timing offset (hereinafter, referred to as 'X'). Here, X may mean a time gap between a triggering/activation/deactivation timing and an actual CSI-RS transmission timing of the CSI-RS.

Here, X may be expressed in the form of the number of slots (i.e., slot unit) or the number of symbols (i.e., symbol unit). As an example, when aperiodic CSI-RS triggering is performed by the DCI, X may be set to '0'.

In various embodiments of the present disclosure, when X is set by a network (i.e., base station), candidate values of X may be indicated by a higher layer message (e.g., RRC message) and may be included in a resource configuration on a CSI framework. Here, it is assumed that X is supported to be set. Here, the candidate values of X may mean preset X values according to a predetermined criterion (or according to a standard). That is, X may be set to a specific value (e.g., 0), but set to values (e.g., 0, 1, 2) which may be used differently according to a situation.

For example, the UE may be indicated '1' as the X value for beam management from the eNB. As a result, when the transmission of the CSI-RS is triggered at a specific timing, the corresponding UE may recognize that the CSI-RS is transmitted after a time gap corresponding to '1' based on the specific timing.

Alternatively, for another example, in services requiring short latency (e.g., Ultra-Reliable and Low Latency Communications (URLLC)), X values may be set shorter than other services.

In this case, the X value to be applied for channel measurement or interference measurement may be indicated through dynamic signaling such as L1 or L2 signaling (e.g., DCI or MAC-CE). In particular, the indication of the X value may be included in an MAC-CE and/or DCI for CSI-RS triggering and be transferred together. That is, the X value may be transferred together with triggering information (e.g., triggered CSI-RS resource setting) for the CSI-RS.

Further, for CSI-RS triggering, in a resource configuration set to RRC signaling, a hierarchical signaling structure may be applied in which a candidate resource is selected through the MAC-CE and in which a final resource is selected with DCI. In this case, the X value may be included in either the MAC-CE or the DCI. Alternatively, after a candidate group is selected through the MAC-CE, a final X value may be set (or indicated) through the DCI. That is, the X value may be hierarchically indicated to the UE using RRC signaling, MAC-CE, and/or DCI.

Further, the X value may be used for setting whether to apply a method of determining a CSI measurement gap proposed in the present specification in a specific situation (e.g., when CSI-RS triggering and CSI reporting triggering are performed simultaneously). A detailed description thereof will be described in detail in the following part of FIG. 12.

Second Embodiment—Setting Method Considerable for CSI Measurement Setting

Next, in relation with the above-described CSI measurement setting, in the NR system, a flexible measurement setting may be allowed, which supports a predetermined combination of the aperiodic/semi-persistent/periodic resource setting for channel measurement and the aperiodic/semi-persistent/periodic resource setting for interference.

In particular, the semi-persistent or periodic interference measurement resources (e.g., ZP CSI-RS and NZP CSI-RS) need to be considered in order to avoid or minimize L1/L2 control signaling when considering semi-persistent CSI reporting or periodic CSI reporting. Further, the aperiodic CSI-RS setting may be associated with semi-persistent or periodic interference measurement resources for the aperiodic CSI reporting. Conversely, the semi-persistent or periodic CSI-RS may be associated with the aperiodic interference measurement resources for the aperiodic CSI reporting.

In conclusion, the measurement setting needs to support a flexible mapping scheme among the aperiodic/semi-persistent/persistent CSI reporting, the aperiodic/semi-persistent/persistent resource setting (e.g., NZP CSI-RS) for the channel measurement, and the aperiodic/semi-persistent/persistent resource settings (e.g., NZP CSI-RS and NZP CSI-RS) for the interference measurement.

Further, in various embodiments of the present disclosure, a specific resource (i.e., resource configuration) in the CSI measurement configuration may be set as a rate matching use upon demodulation of a data channel (e.g., NR-PDSCH). In other words, when it is determined that interference transmitted (or received) by a corresponding CSI-RS resource is large, as in a ZP CSI-RS of a legacy LTE system, the eNB may set use to null the corresponding resource. Thereby, a degree of interference that may occur upon channel measurement or interference measurement of the UE receiving the corresponding indication may be efficiently controlled.

Third Embodiment—Setting Method Considerable for CSI Reporting Setting

Next, in relation with the above-described CSI reporting setting, the NR system may support the aperiodic CSI reporting, the semi-persistent CSI reporting, and the periodic CSI reporting.

In this case, appropriate CSI reporting contents need to be defined according to the above-described CSI measurement setting configuration.

First, if the CSI-RS resource(s) for CSI acquisition is indicated in a specific measurement setting, the corresponding CSI reporting contents may be existing CSI reporting types supported in the LTE system (in particular, eFD-MIMO WI).

Unlike this, if the CSI-RS resource(s) for the beam management are indicated in a specific measurement setting, the corresponding CSI report contents may be determined based on required reporting contents in order to support DL beam management. Since respective CSI-RS ports in the CSI resource may correspond to different analog beams, the corresponding CSI reporting contents may be information (e.g., {CRI, port index}) configured by a pair for reporting appropriate beam direction information. In addition to beam related information, a beam gain related metric such as RSRP needs to be reported together.

Further, the CSI reporting setting may include CSI reporting offset (hereinafter, referred to as 'Y'). Here, Y may mean a time gap between a triggering/activation/deactivation time point of a CSI report and an actual CSI-RS reporting instance or timing.

For example, in case of a DL-UL mixed slot structure (e.g., a self-contained slot structure) considered in an NR system, a case may occur in which a CSI report may not be performed immediately in a slot in which the CSI report is triggered. Considering such a case, it is necessary to set a Y value indicating a gap between a time point in which the CSI report is triggered and a time point in which the actual UE performs the CSI report. For example, the Y value may mean an interval (gap) from a time point at which DCI triggering a CSI report is received to a time point at which the UE reports CSI through a data channel (e.g., a Physical Uplink Shared Channel (PUSCH) (or control channel).

The Y value may be expressed in the form of the number of slots (i.e., slot unit) or the number of symbols (i.e., symbol unit), and may be fixed in advance in a system or be set (or instructed) by a network (e.g., eNB).

In this case, a candidate value(s) of the Y may be supported according to information included in CSI reporting setting. For example, the candidate values of the Y may be set based on a CSI parameter, a CSI type (e.g., CSI type 1 or 2), a codebook configuration (e.g., codebook size), nearest CSI-RS transmission timing, a DL-UL slot structure, a UE capability, and the number of CSI computations related to the corresponding CSI reporting setting.

When the candidate values of the Y are set based on the above-described information, explicit signaling of the Y value may be unnecessary. In this case, signaling of the Y value may be performed, and a lower limit value of the Y value may be set based on the above-described information.

Fourth Embodiment—Flexible CSI Measurement and Reporting Method Using a Parameter Value of CSI Reporting Setting However, in relation to CSI measurement and reporting of the UE, separate from the Y value, a minimum time gap required (hereinafter, referred to as 'Z') for performing the CSI report may be considered based on a time point in which the UE receives the actual CSI-RS.

This is because, even if the UE receives a CSI-RS from the eNB, a case may occur in which measurement of the corresponding CSI-RS may not be performed until the indicated (i.e., triggered) CSI reporting instance.

Here, the Z may mean a processing time gap required for the UE to report the CSI using the CSI-RS received from the eNB. That is, the Z may mean a minimum time gap between CSI reporting instances and CSI-RS transmission time points. Further, the Z may mean gap information that sets a measurement interval (or measurement gap) for generating a measurement value of the CSI report.

For example, the CSI-RS received in the Z (e.g., Z window) based on a time point at which the UE performs a CSI report triggered by the eNB, may not be accurately measured until the corresponding CSI reporting instance by the UE and thus may not be used in the corresponding CSI report.

In this case, the Z value may be set in consideration of a CSI computation time (i.e., CSI processing time) required for the CSI report in the corresponding UE. That is, the Z value may be set according to information elements that determine the CSI computation processing time.

Specifically, the Z value may be set according to codebook configuration information including CSI reporting configuration parameters (e.g., CSI parameter, CSI type, CSI codebook type, codebook size, and codebook set (or subset) restriction), frequency granularity of CQI and PMI, and UE capability (e.g., UE computation capability).

For example, when a codebook to be used by the UE is set (i.e., grouped) to a subset and is limited to a specific codebook subset(s), the Z value may be set small. This is because, when the codebook subset is limited, a time required for the UE to select a codebook to perform CSI measurement is reduced. That is, when the UE does not apply all codebooks and is set to use only a specific range of codebooks, the Z value may be set small by the network (or eNB).

Further, the Z value may be determined according to the number of CSI reporting settings dynamically selected through L1 or L2 signaling. Further, a required time may vary according to an operation type of a time domain for the CSI reporting setting. Specifically, the Z value may be set differently when two periodic CSI reporting settings are designated and when two aperiodic (or semi-persistent) CSI reporting settings are designated. Further, the Z value may be set differently in a case in which one periodic CSI reporting setting is designated and a case in which two periodic CSI reporting settings are designated. That is, the Z value may be set differently according to a method in which the CSI reporting setting is set to the UE.

The Z value may be set or indicated for each UE by the eNB (or the network). For example, the Z value may be included in CSI reporting configuration information transferred through higher layer signaling (e.g., RRC signaling). For another example, the Z value may be transferred together with CSI reporting configuration dynamically indicated (or triggered) through L1 or L2 signaling (i.e., DCI or MAC-CE).

In this case, the UE may report the Z value as a capability thereof to the eNB. As the UE reports a UE capability of the Z value to the eNB, the eNB may set the Z value in consideration of a UE capability. That is, the Z value may be set in an implicit manner by the capability report of the UE.

Hereinafter, the present specification proposes a specific method of performing CSI measurement and reporting in consideration of the above-described Z value (i.e., a value indicating a time required to perform CSI reporting based on a CSI-RS transmission time point).

When the UE receives an indication of a CSI report from the eNB (i.e., when the CSI report is triggered), the CSI-RS may be set (i.e., transmission setting), be triggered, or be activated at a time point after the CSI reporting instance— the Z value. In this case, when calculating a channel or interference estimation value for the corresponding CSI report, the UE may ignore an estimated value (or measured value) calculated from the corresponding CSI-RS. Here, the CSI-RS resource used for CSI reporting may be indicated to a reference resource of the corresponding CSI report, and the Z value may be a parameter for setting a reference resource.

However, a CSI report (i.e., additional CSI report) is set at a subsequent time point, and when the CSI-RS exists before the corresponding reporting instance—the Z value, in the CSI report at the corresponding time point (i.e., future time point), an estimated value from the previously ignored CSI-RS may be used.

In other words, the CSI-RS existing within a previous time gap corresponding to the Z value based on the CSI reporting instance triggered by the eNB may not be used for the corresponding CSI reporting. For example, it is assumed that CSI reporting triggering is indicated in a #n slot, a CSI reporting instance is indicated to be performed in #n+8 slot, and the Z value is indicated to 2 slots. In this case, the UE may be set to ignore a value estimated by the CSI-RS received in a previous time gap (i.e., from #n+6 slot to #n+8 slot) corresponding to the Z value based on the CSI reporting instance.

Figure 10:
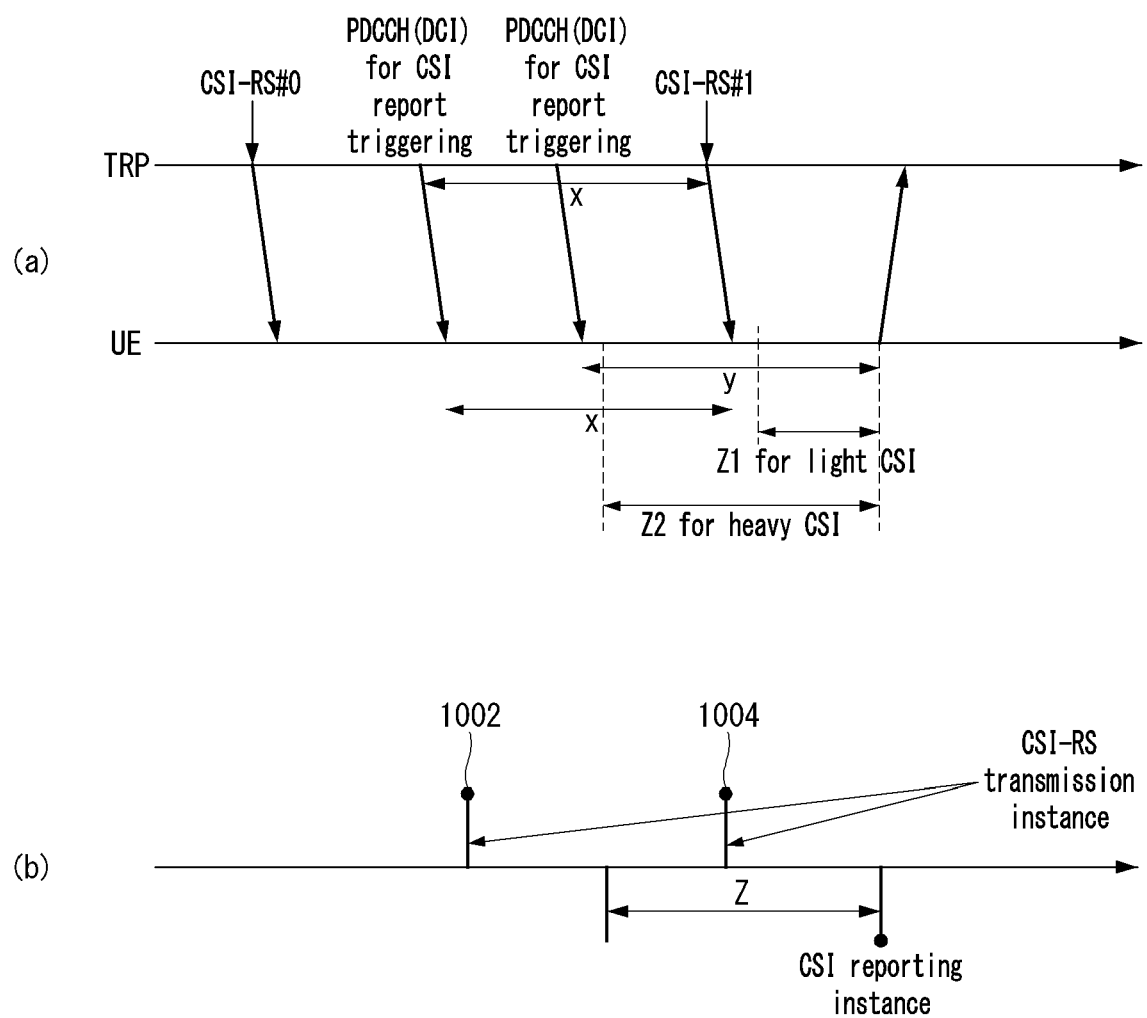
FIG. 10 illustrates an example of a method of performing CSI measurement and reporting to which a method proposed in the present specification can be applied.

FIG. 10 illustrates an example of a method of performing CSI measurement and reporting to which a method proposed in the present specification can be applied. FIG. 10 is merely for convenience of description and does not limit the scope of the invention.

Referring to FIG. 10, it is assumed that a UE and an eNB (i.e., TRP) perform a CSI measurement procedure and a reporting procedure based on the above-described CSI framework.

FIG. 10($a$) illustrates an overall procedure of CSI measurement and reporting and setting values (i.e., X value, Y value, and Z value) related thereto.

'X' illustrated in FIG. 10($a$) represents a time gap between a triggering/activation/deactivation time point of transmission of the CSI-RS and transmission of an actual CSI-RS. For example, in the case of CSI-RS #1, 'X' may mean a gap from a time point in which the UE receives a PDCCH (i.e., DCI) for triggering of the CSI-RS to a time point in which the UE actually receives the CSI-RS.

Further, 'Y' illustrated in FIG. 10($a$) illustrates a time gap between a triggering/activation/deactivation time point of the above-described CSI report and an actual CSI reporting instance. For example, 'Y' may mean an interval from a time point in which the UE receives the PDCCH (i.e., DCI) including triggering information of the CSI report to a time point in which the UE directly performs the CSI report.

Further, as described above, the Z value may be set according to various information elements and may be set to, for example, 'Z1' for light CSI (i.e., CSI of low complexity) according to a predetermined criterion and 'Z2' for heavy CSI (i.e., CSI of high complexity).

Here, the light CSI may mean CSI in which a CSI processing time by the UE is less set, and the heavy CSI may mean CSI in which a CSI processing time by the UE is largely set. For example, CSI in which the number of antenna ports related to CSI measurement and reporting is N or more may correspond to heavy CSI, and CSI in which the number of antenna ports related to CSI measurement and reporting is less than N may correspond to light CSI.

In this case, an estimated value of an CSI-RS (i.e., a channel or interference estimated value measured using the CSI-RS) received within a Z interval based on the triggered CSI reporting instance is not included in information for the CSI report. That is, the Z value may be indicated to a measurement window, and an estimated value of the CSI-RS received within the measurement window may be ignored in the CSI report.

For example, when the CSI report of Z1 is triggered, the UE may include an estimated value of the previously received CSI-RS #0 and an estimated value of the CSI-RS #1 in the CSI reporting information. Alternatively, when the CSI report of Z2 is triggered, the UE may ignore an estimated value of the CSI-RS #1 and include only an estimated value of the CSI-RS #0 in the CSI reporting information.

FIG. 10($b$) illustrates a simplified example related to the above-described operation of the UE. Referring to FIG. 10($b$), a CSI-RS 1002 received before the Z value based on the CSI reporting instance may be used for the CSI report, and a CSI-RS 1004 received after the Z value may be ignored in the CSI report.

The above-described operation of the UE may be equally applied to not only when an aperiodic CSI-RS and/or an aperiodic CSI report is triggered, but also a periodic CSI-RS and/or a periodic CSI report, a semi-persistent CSI-RS, and/or a semi-persistent CSI report. In other words, the above-described operation of the UE may be applied regardless of an operation type of a time domain of CSI-RS triggering (i.e., CSI-RS transmission triggering) and CSI reporting triggering.

Further, in various embodiments of the present disclosure, when CSI-RS triggering and CSI reporting triggering exist at the same time point (e.g., the same slot or the same symbol), a method of determining whether the UE operates according to a predetermined criterion may be considered. Here, the predetermined criterion may be set using the above-described X value, Y value, and Z value. In particular, it is necessary that the Z value is guaranteed between the Y value and the X value.

For example, whether an operation of the above-described UE may be determined by comparing a difference value between the Y value and the X value and the Z value.

Figure 11:
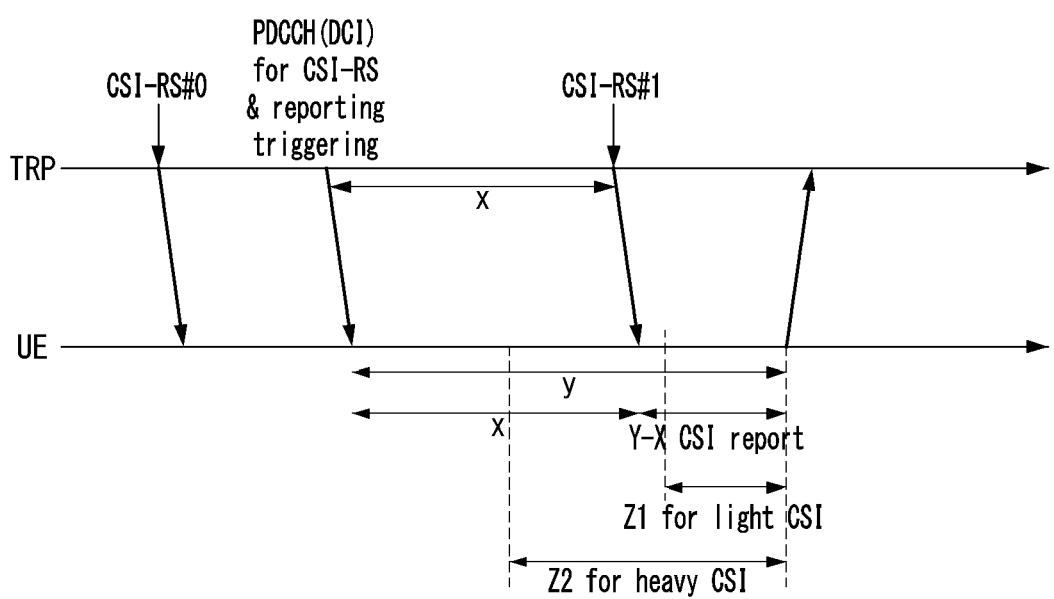
FIG. 11 illustrates another example of a method of performing CSI measurement and reporting to which a method proposed in the present specification can be applied.

FIG. 11 illustrates another example of a method of performing CSI measurement and reporting to which the method proposed in the present specification can be applied. FIG. 11 is merely for convenience of description and does not limit the scope of the present disclosure.

A description of a configuration and operation overlapped with the contents of FIG. 10 among contents of FIG. 11 will be omitted. In the case of FIG. 11, unlike FIG. 10, CSI-RS triggering (specifically, triggering of CSI-RS #1) and CSI reporting triggering may be simultaneously indicated through a PDCCH (i.e., DCI). In this case, two triggering indications may be indicated through one DCI or through two DCIs (i.e., each DCI).

In this case, by comparing a difference value (Y-X value) between the Y value and the X value and the Z value set for the CSI report, it may be determined whether an estimated value of a specific CSI-RS is included in the CSI reporting information.

For example, in the case of CSI-RS #1, it is assumed that a Z1 value is smaller than a Y-X value and the Z2 value is larger than a Y-X value. In this case, when the CSI report of Z1 is triggered, the UE may include an estimated value of the previously received CSI-RS #0 and an estimated value of the CSI-RS #1 in the CSI reporting information. Alternatively, when the CSI report of Z2 is triggered, the UE may ignore an estimated value of the CSI-RS #1 and include only the estimated value of the CSI-RS #0 in the CSI reporting information.

In other words, when the Z value is set larger than the Y-X value, the estimated value (i.e., channel or interference estimated value) of the CSI-RS may be ignored in the CSI report of the UE. However, the ignored estimated value may be utilized in a CSI report (e.g., preset or dynamically triggered/activated CSI report) at a future time point.

For reference, in a legacy LTE system, CSI reporting information was determined using an estimated value of the CSI-RS before a time point (e.g., n-4th subframe) determined as a standard based on the CSI reporting instance. However, through the above-described operation of the UE, an NR system may perform more flexible CSI measurement and reporting. In other words, using a Z value set in consideration of an actual CSI-RS transmission instance and an actual CSI reporting instance, there is an advantage that an adaptive CSI report is available rather than the CSI report through a uniform method (e.g., n-4th slot based on the nth slot).

Further, in various embodiments of the present disclosure, when the above-described Z value is set for a CSI report of a UE, an estimated value (or measured value) calculated for the CSI report may vary according to whether a measurement restriction, which is an information element included in the CSI reporting setting. Here, whether measurement is restricted may be represented by an indicator indicating the measurement restriction ON or OFF. Here, that the measurement restriction is set to ON may mean that the UE is set to perform a channel or interference estimation using only an estimated value by the RS transmitted at a nearest time point among RSs (e.g., CSI-RS) transmitted at a plurality of instances.

Figure 12:
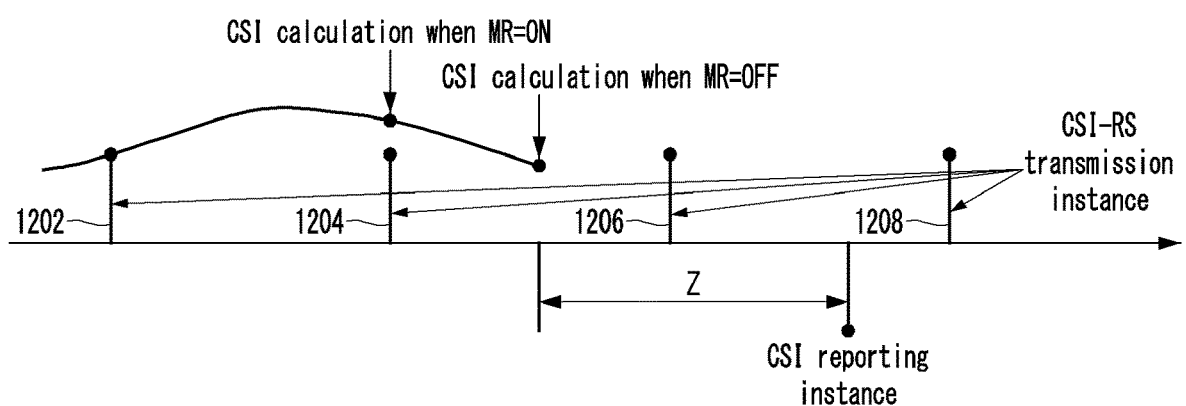
FIG. 12 illustrates another example of a method of performing CSI measurement and reporting to which a method proposed in the present specification can be applied.

FIG. 12 illustrates another example of a method of performing CSI measurement and reporting to which a method proposed in the present specification can be applied. FIG. 12 is only for the convenience of description and does not limit to the scope of the present disclosure.

Referring to FIG. 12, it is assumed that the above-described Z value and whether measurement restriction are set (or indicated) through CSI reporting setting. Further, it is assumed that the triggered CSI-RSs 1202 to 1208 are transmitted periodically, but the method is not limited to the case in which the CSI-RS is periodically transmitted, but may be applied to the case in which the CSI-RS is transmitted aperiodically or semi-persistently. Further, it is assumed that a CSI report is aperiodic, but the method may be applied to a periodic CSI report or a semi-persistent CSI report, which is not limited thereto.

When the Z value is set to the UE and the measurement restriction is indicated to ON, the UE may be set to use the nearest measured estimation value (channel estimation value or interference estimation value) at a time point before the Z value (i.e., the CSI reporting instance-Z) based on the CSI reporting instance. For example, the UE may perform CSI computation using only the recently received CSI-RS 1204 among the CSI-RSs 1202 and 1204 received before a time gap corresponding to the Z value based on the CSI reporting instance.

In this case, before the time gap corresponding to the Z value based on the CSI reporting instance, a position of an NZP CSI-RS symbol(s) for the nearest channel measurement and a position of a ZP or NZP CSI-RS symbol(s) for interference measurement may be different. In this case, the UE may use a measured value based on the CSI-RS transmitted before the time gap corresponding to the Z value based on the CSI reporting instance for each of channel measurement and interference measurement.

Further, although the continuous CSI-RS is triggered, only one estimated value belonging to a time point before the Z value exists (e.g., semi-persistent CSI-RS) based on the CSI reporting instance or the aperiodic CSI-RS may be triggered at a time point before the Z value based on the CSI reporting instance. In this case, the UE may perform CSI computation based on the estimated value of the CSI-RS of the transmission time point.

However, when the Z value is set to the UE and the measurement restriction is indicated to OFF or when there are a plurality of estimated values (e.g., semi-persistent CSI-RS) at a time point before the Z value based on the CSI reporting instance, the UE may perform CSI computation using one or more estimated values up to a time point before the Z value based on the CSI reporting instance. In other words, when the measurement restriction is indicated to OFF, the UE may ignore a value measured by the CSI-RS received within a time gap (i.e., 'Z segment' illustrated in FIG. 12) corresponding to the Z value based on the CSI reporting instance upon reporting CSI. That is, in this case, it is unnecessary that the UE updates the CSI report value according to a value measured by the CSI-RS received within a time gap corresponding to the Z value based on the CSI reporting instance.

In this case, the UE may calculate CSI with an average value of one or more estimated values. In particular, by applying a weighted average to one or more estimated values, the UE may calculate CSI. In this case, the UE may apply a high weight to a recently estimated channel (i.e., CSI-RS).

Alternatively, the UE may perform extrapolation up to a time point before the Z value based on the CSI reporting instance based on one or more estimation values and use an estimated value as a channel estimation value or interference estimation value for the corresponding CSI report. For example, the UE may calculate an estimated value of the CSI-RS 1202 and an estimated value of the CSI-RS 1204, and then apply extrapolation to the CSI reporting instance—Z time point of a calculated value to calculate a predicted estimated value. Here, the extrapolation may mean an analysis technique of predicting and estimating a value after a predetermined time according to a degree of a specific value.

When using the above-described method, there is an advantage that the UE may obtain latest information on a channel state (i.e., connected state) rather than when a predetermined measurement time point is defined. Specifically, in legacy LTE, the UE was set to perform measurement only before a predetermined interval (e.g., n-4th subframe) based on the CSI reporting instance. In contrast, the proposed method of the present disclosure, which can acquire information on a channel state until a Z value set in consideration of a CSI computation capability of the UE, there is an advantage that a channel (or interference) estimation value more accurate (i.e., reflecting the latest channel state) than that of legacy LTE may be obtained.

Fifth Embodiment—Method of Performing CSI Reporting in Consideration of CSI Reporting Offset As described above, in consideration of CSI-RS timing offset (i.e., the above-described X value), CSI reporting offset (i.e., the above-described Y value), and a CSI computation time (i.e., the above-described Z value) required for the CSI report, a method of performing the CSI report of the UE may be considered. That is, the CSI report may be set in consideration of various computation times in which such a UE may be required to perform the CSI report.

In an NR system, in the case of an aperiodic CSI report, multiple CSI reporting offset values (i.e., the above-described Y values) may be supported. For example, in an NR system, the Y value may be supported by values such as at least 0, 1, 2, 3, and 4. In this case, the Y value may be set by the network.

However, according to a transmission type of the CSI-RS, supportable (or applicable) CSI reporting offset for the CSI report may be set differently. Here, as described above, the transmission type of the CSI-RS may mean periodic CSI-RS transmission, semi-persistent CSI-RS transmission, aperiodic CSI-RS transmission, and the like.

For example, the CSI reporting offset '0' value (i.e., CSI reporting offset (Y)=0) may be limitedly supported only when the CSI-RS is transmitted in a previous slot (or frame). That is, only when the CSI-RS is transmitted in the previous slot, the eNB may set the CSI reporting offset '0' value to the UE. In this case, the UE may not expect that 'Y=0' is not set for the aperiodic CSI report.

Here, that the CSI reporting offset is set to a value of '0' may mean that a time gap from a reception time point of DCI triggering the CSI report to a time point of performing an actual CSI report is set to '0' (or a smallest value of Y values that can be set). Further, the previous slot may mean a slot positioned before the slot in which DCI indicating the CSI report is transmitted.

That is, setting of 'Y=0' may be supported only when channel measurement through a CSI-RS was performed prior to triggering DCI reception.

Therefore, 'Y=0' setting may be supported only upon semi-persistent CSI-RS transmission or periodic CSI-RS transmission. In other words, only upon semi-persistent CSI-RS transmission or periodic CSI-RS transmission, CSI reporting offset may be set to a value of '0'. That is, upon aperiodic CSI-RS transmission, the UE may be set not to expect the CSI reporting offset (Y value) to be set to '0'.

Further, in the case of an NR system, the number of symbols (e.g., OFDM symbols) constituting one slot may vary. For example, one slot may be configured with fourteen OFDM symbols, seven OFDM symbols, or two OFDM symbols. When the number of symbols is set to be small, the corresponding slot may be referred to as a mini-slot. In this way, various slot types (e.g., 14 symbol slot type, 7 symbol slot type, etc.) may be set according to different numbers of OFDM symbols constituting one slot.

In this case, a method of separately setting an allowed condition or a disallowed condition for each CSI reporting offset value (i.e., the above-described Y value) may be considered according to the slot type. Here, the allowed condition or the disallowed condition may be a CSI parameter, a CSI codebook type, and the number of CSI-RS antenna ports for each Y value.

For example, in consideration of the CSI computation time (e.g., CSI computation time in hardware), 'Y=m' in the 14 symbol slot type may correspond to 'Y=2m' in the 7 symbol slot type. Specifically, 'Y=1' in the 14 symbol slot type may correspond to 'Y=2' in the 7 symbol slot type. That is, an allowed condition (or disallowed condition) corresponding to 'Y=1' in the 14 symbol slot type may be equally set to the allowed condition (or disallowed condition) corresponding to 'Y=2' in the 7 symbol slot type.

Generalizing this, 'Y=k' in an M symbol slot type configured with the M number of symbols may correspond to 'Y=M/N*k' in an N symbol slot type configured with the N number of symbols.

Further, according to each slot type, a range of Y values that can be supported may be defined differently. In this case, the smaller the number of symbols constituting the slot, the greater a minimum value and/or a maximum value of the Y value may be defined.

Further, in consideration of the fact that a maximum uplink payload size that can be transmitted by the UE may be limited according to a slot type, a separate disallowed condition (or allowed condition) may be additionally set. For example, type 2 feedback (e.g., CSI Type 2, linear combining codebook based feedback, covariance matrix feedback, eigen value/vector feedback, channel coefficient quantized feedback) requiring a relatively large amount of feedback may be set not to be supported in a slot structure configured with 7 symbols or less.

Further, according to a specific Y value, the above-described allowed condition or disallowed condition may be defined differently. Specifically, in each case of at least 'Y=0' and 'Y=1', the above-described allowed condition or disallowed condition may be defined differently.

For example, when PMI is included as the CSI reporting parameter, setting of 'Y=0' may be disallowed. In another example, when the number of CSI-RS ports exceeds a specific value (e.g., Z), setting of 'Y=0' may be disallowed. For another example, as described above, setting of 'Y=0' may be allowed only when the related CSI-RS is transmitted in the previous slot(s).

Figure 13:
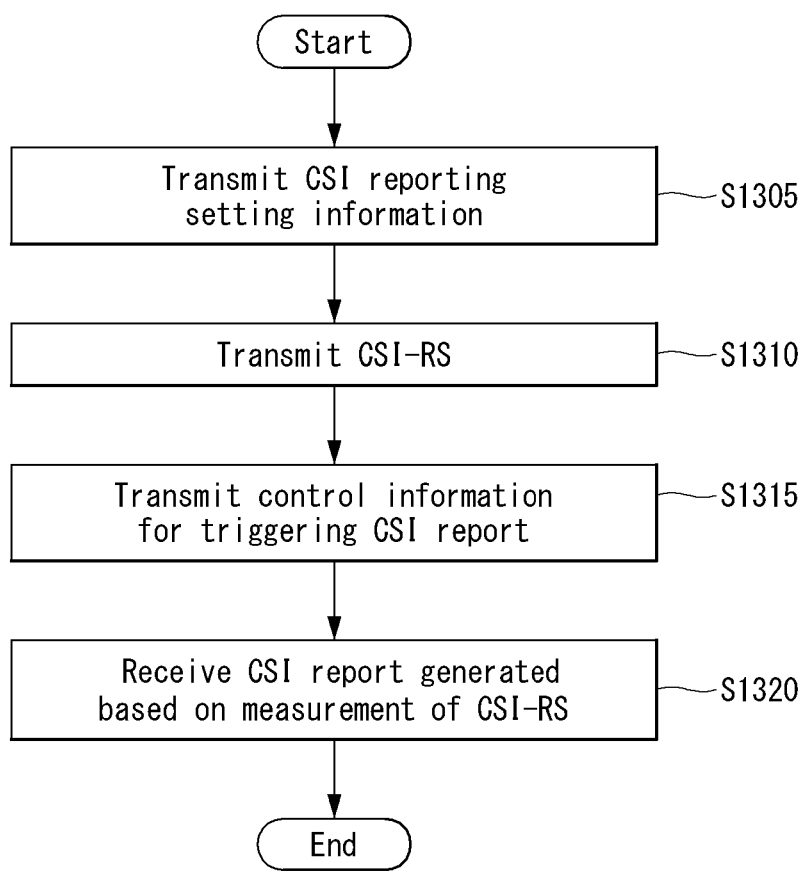
FIG. 13 is a flowchart illustrating an operation of a base station related to a procedure for measuring and reporting CSI to which a method proposed in the present specification may be applied.

FIG. 13 is a flowchart illustrating an operation of a eNB related to a procedure of measuring and reporting CSI to which a method proposed in the present specification may be applied. FIG. 13 is merely for convenience of description and does not limit the scope of the present disclosure.

Referring to FIG. 13, the UE and the eNB perform a CSI measurement procedure and a reporting procedure based on the above-described CSI framework, and in this case, it is assumed that the above-described methods are used independently or in combination with each other. For example, operations of the eNB and the UE described in FIG. 13 may be set to be performed based on the method proposed in the fifth embodiment.

In step S1305, the eNB may transmit CSI reporting setting information related to the CSI report to the UE. Here, the CSI reporting setting information may include information (e.g., the above-described Y value) indicating time offset for the CSI report. In this case, the time offset for the CSI report may mean a time gap between a time point in which the UE receives control information for triggering the CSI report and a time point (i.e., CSI reporting instance) in which the UE transmits the CSI report.

In step S1310, the eNB may transmit a channel state information reference signal (CSI-RS) to the UE. Further, in step S1315, the eNB may transmit control information for triggering (or activating/deactivating) the CSI report. For example, the CSI-RS may be transmitted from a specific slot positioned before a slot in which control information for triggering the CSI report is transmitted.

However, FIG. 13 illustrates that step S1310 is performed before step S1315, but steps S1310 and S1315 may be performed simultaneously or step S1315 may be performed first and then step S1310 may be performed.

Thereafter, in step S1320, the eNB may receive a CSI report generated based on measurement of the CSI-RS from the UE.

In this case, when information indicating time offset for the CSI report is set to a value '0' (e.g., 'Y=0'), in step S1310, the CSI-RS is transmitted periodically or semi-persistently. That is, in the case of an aperiodic CSI report, the UE may be set not to expect that 'Y=0' is to be set.

Further, information indicating the time offset for the CSI report may be set differently for each slot type, as in the above-described method.

Further, as described above, the above-described methods may be equally or similarly applied to general beam reporting (e.g., CRI, SSB-ID and/or L1-RSRP based beam reporting) as well as the CSI report.

Overview of Devices to which Present Disclosure is Applicable

Figure 14:
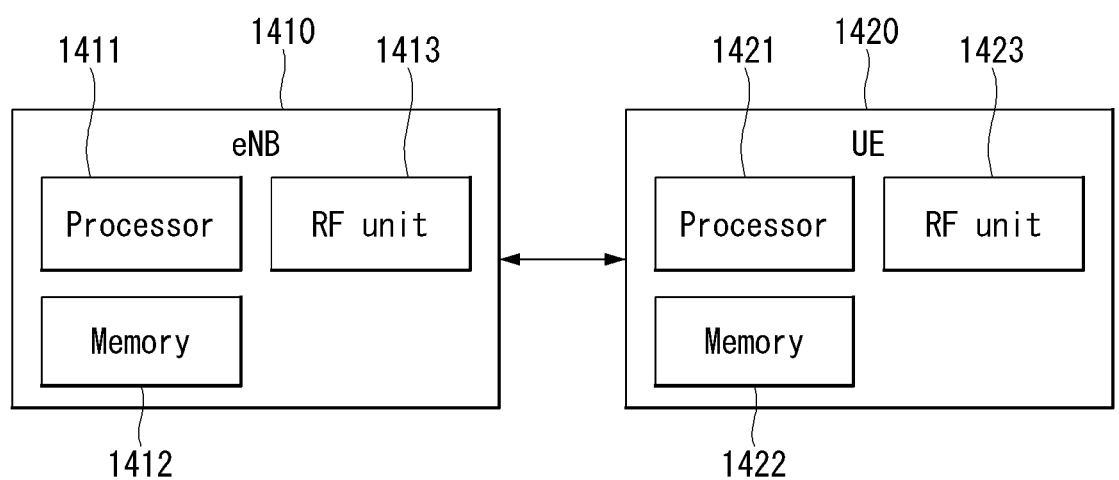
FIG. 14 is a block diagram illustrating a wireless communication device according to one embodiment of the present disclosure.

FIG. 14 illustrates a block diagram of a wireless communication device according to an embodiment of the present disclosure.

Referring to FIG. 14, a wireless communication system includes a base station (or network) 1410 and a UE 1420.

The base station 1410 includes a processor 1411, a memory 1412, and a communication module 1413.

The processor 1411 implements a function, a process, and/or a method which are proposed in FIGS. 1 to 13 above. Layers of a wired/wireless interface protocol may be implemented by the processor 1411. The memory 1412 is connected with the processor 1411 to store various pieces of information for driving the processor 1411. The communication module 1413 is connected with the processor 1411 to transmit and/or receive a wired/wireless signal.

The communication module 1413 may include a radio frequency (RF) unit for transmitting/receiving a radio signal.

The UE 1420 includes a processor 1421, a memory 1422, and a communication module (or RF unit) 1423. The processor 1421 implements a function, a process, and/or a method which are proposed in FIGS. 1 to 13 above. The layers of the wireless interface protocol may be implemented by the processor 1421. The memory 1422 is connected with the processor 1421 to store various pieces of information for driving the processor 1421. The communication module 1423 is connected with the processor 1421 to transmit and/or receive the wireless signal.

The memories 1412 and 1422 may be positioned inside or outside the processors 1413 and 1421 and connected with the processors 1413 and 1421 by various well-known means.

Further, the base station 1410 and/or the UE 1420 may have a single antenna or multiple antennas.

Figure 15:
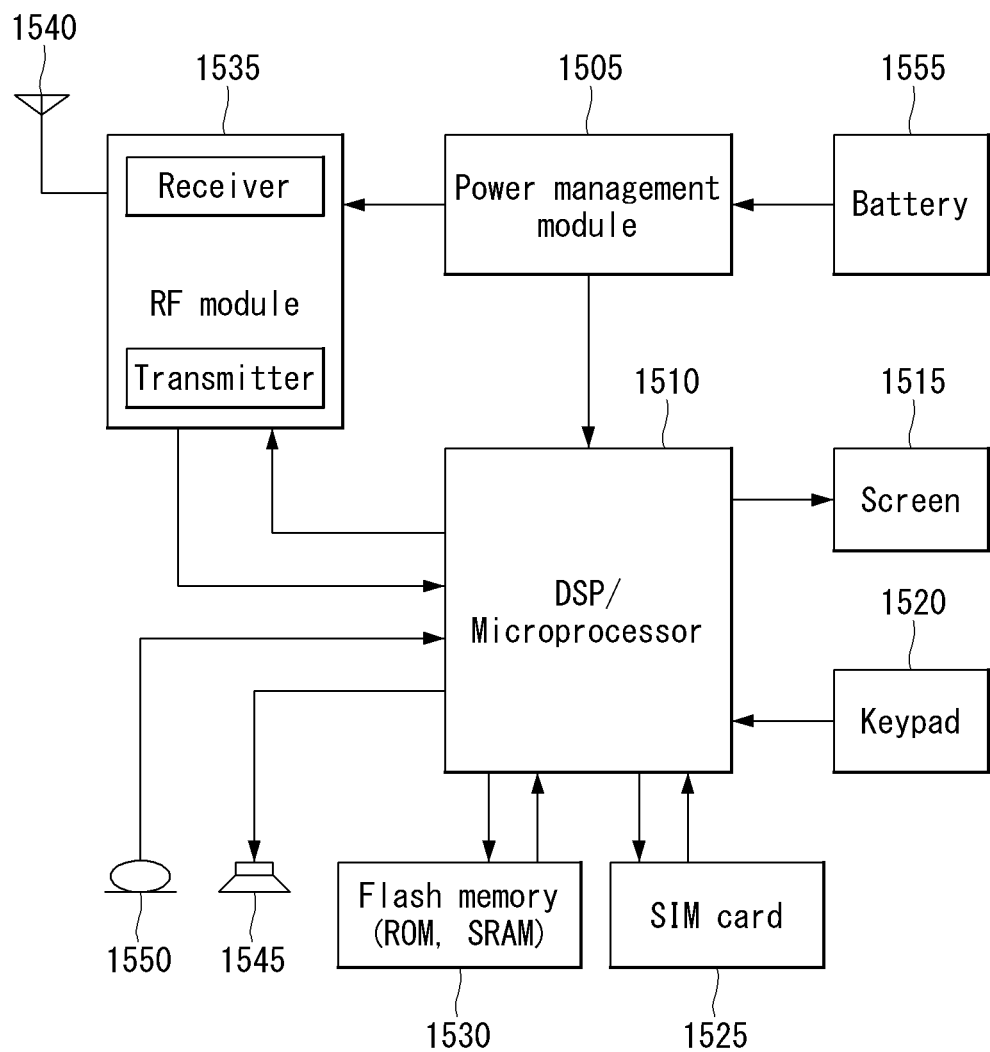
FIG. 15 is a block diagram illustrating a communication device according to one embodiment of the present disclosure.

FIG. 15 illustrates a block diagram of a communication device according to an embodiment of the present disclosure.

In particular, FIG. 15 is a diagram more specifically illustrating the UE of FIG. 14 above.

Referring to FIG. 15, the UE may be configured to include a processor (or a digital signal processor (DSP) 1510, an RF module (or RF unit) 1535, a power management module 1505, an antenna 1540, a battery 1555, a display 1515, a keypad 1520, a memory 1530, a subscriber identification module (SIM) card 1525 (this component is optional), a speaker 1545, and a microphone 1550. The UE may also include a single antenna or multiple antennas.

The processor 1510 implements a function, a process, and/or a method which are proposed in FIGS. 1 to 13 above. Layers of a wireless interface protocol may be implemented by the processor 1510.

The memory 1530 is connected with the processor 1510 to store information related to an operation of the processor 1510. The memory 1530 may be positioned inside or outside the processor 1510 and connected with the processor 1510 by various well-known means.

A user inputs command information such as a telephone number or the like by, for example, pressing (or touching) a button on the keypad 1520 or by voice activation using the microphone 1550. The processor 1510 receives such command information and processes to perform appropriate functions including dialing a telephone number. Operational data may be extracted from the SIM card 1525 or the memory 1530. In addition, the processor 1510 may display command information or drive information on the display 1515 for the user to recognize and for convenience.

The RF module 1535 is connected with the processor 1510 to transmit and/or receive an RF signal. The processor 1510 transfers the command information to the RF module 1535 to initiate communication, for example, to transmit wireless signals constituting voice communication data. The RF module 1535 is constituted by a receiver and a transmitter for receiving and transmitting the wireless signals. The antenna 1540 functions to transmit and receive the wireless signals. Upon receiving the wireless signals, the RF module 1535 may transfer the signal for processing by the processor 1510 and convert the signal to a baseband. The processed signal may be converted into to audible or readable information output via the speaker 1545.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. It is evident that an embodiment may be constructed by combining claims having no explicit citation relation in the claims or may be included as a new claim by amendments after filing an application.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It is evident to those skilled in the art that the present disclosure may be materialized in other specific forms without departing from essential characteristics thereof. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

Although a method of measuring and reporting channel state information in a wireless communication system of the present disclosure has been described with reference to an example applied to a 3GPP LTE/LTE-A system and 5G, the method can be applied to various wireless communication systems.

What is claimed is:

1. A method of reporting channel state information (CSI) in a wireless communication system, the method performed by a base station comprises:
    transmitting CSI reporting setting information related to a CSI report to a terminal, wherein the CSI reporting setting information comprises information indicating time offset for the CSI report;
    transmitting a channel state information reference signal (CSI-RS) to the terminal;
    transmitting control information for triggering the CSI report to the terminal; and
    receiving a CSI report generated based on measurement of the CSI-RS from the terminal,
    wherein the CSI-RS is transmitted periodically or semi-persistently, based on the time offset for the CSI report being set to a value '0',
    wherein the time offset for the CSI report is set for each slot type,
    wherein the slot type is set according to the number of symbols constituting one slot, and
    wherein the time offset 'k' in a slot type configured with the M number of symbols corresponds to the time offset 'M/N*k' in an N symbol slot type configured with the N number of symbols.

2. The method of claim 1, wherein the time offset for the CSI report is a time gap between a time point in which the terminal receives control information for triggering the CSI report and a time point in which the terminal transmits the CSI report.

3. The method of claim 1, wherein based on the CSI-RS being transmitted at a specific slot positioned before a slot in which control information for triggering the CSI report is transmitted, the time offset is set to the value '0'.

4. The method of claim 3, wherein measurement of the CSI-RS is performed before the terminal receives control information for triggering the CSI report.

5. A base station for receiving reporting of channel state information (CSI) in a wireless communication system, the base station comprising:
    a radio frequency module (RF module) for transmitting and receiving a radio signal; and
    a processor functionally connected to the RF module, wherein the processor controls to:
    transmit CSI reporting setting information related to a CSI report to a terminal, wherein the CSI reporting setting information comprises information indicating time offset for the CSI report,
    transmit a channel state information reference signal (CSI-RS) to the terminal,
    transmit control information for triggering the CSI report to the terminal,
    receive a CSI report generated based on measurement of the CSI-RS from the terminal,
    wherein the CSI-RS is transmitted periodically or semi-persistently, based on the time offset for the CSI report being set to a value '0',
    wherein the time offset for the CSI report is set for each slot type,
    wherein the slot type is set according to the number of symbols constituting one slot, and
    wherein the time offset 'k' in a slot type configured with the M number of symbols corresponds to the time offset 'M/N*k' in an N symbol slot type configured with the N number of symbols.

6. A method in which a terminal reports channel state information (CSI) in a wireless communication system, the method comprising:
    receiving CSI report setting information related to a CSI report from a base station, wherein the CSI reporting setting information comprises information indicating time offset for the CSI report;
    receiving a channel state information reference signal (CSI-RS) from the base station;
    receiving control information for triggering the CSI report from the base station; and
    reporting CSI generated based on measurement of the CSI-RS to the base station,
    wherein the CSI-RS is transmitted periodically or semi-persistently, based on the time offset for the CSI report being set to a value '0',
    wherein the time offset for the CSI report is set for each slot type,
    wherein the slot type is set according to the number of symbols constituting one slot, and
    wherein the time offset 'k' in a slot type configured with the M number of symbols corresponds to the time offset 'M/N*k' in an N symbol slot type configured with the N number of symbols.

7. A terminal for reporting channel state information (CSI) in a wireless communication system, the terminal comprising:
    a communication module for transmitting and receiving a radio signal; and
    a processor configured to control the communication module,
    wherein the processor is configured to:
    receive CSI report setting information related to a CSI report from a base station, wherein the CSI reporting setting information comprises information indicating time offset for the CSI report;
    receive a channel state information reference signal (CSI-RS) from the base station;
    receive control information for triggering the CSI report from the base station; and
    report CSI generated based on measurement of the CSI-RS to the base station,
    wherein the CSI-RS is transmitted periodically or semi-persistently, based on the time offset for the CSI report being set to a value '0',
    wherein the time offset for the CSI report is set for each slot type,
    wherein the slot type is set according to the number of symbols constituting one slot, and
    wherein the time offset 'k' in a slot type configured with the M number of symbols corresponds to the time offset 'M/N*k' in an N symbol slot type configured with the N number of symbols.

* * * * *